United States Patent
Konishi et al.

(10) Patent No.: US 12,037,245 B2
(45) Date of Patent: Jul. 16, 2024

(54) GRAPHENE DISPERSION LIQUID, METHOD FOR PRODUCING SAME, AND ELECTRODE FOR SECONDARY BATTERY

(71) Applicant: Toray Industries, Inc., Tokyo (JP)

(72) Inventors: Takashi Konishi, Otsu (JP); Eiichiro Tamaki, Otsu (JP)

(73) Assignee: Toray Industries, Inc., Tokyo (JP)

( * ) Notice: Subject to any disclaimer, the term of this patent is extended or adjusted under 35 U.S.C. 154(b) by 634 days.

(21) Appl. No.: 17/284,105

(22) PCT Filed: Oct. 28, 2019

(86) PCT No.: PCT/JP2019/042102
§ 371 (c)(1),
(2) Date: Apr. 9, 2021

(87) PCT Pub. No.: WO2020/090704
PCT Pub. Date: May 7, 2020

(65) Prior Publication Data
US 2021/0354989 A1   Nov. 18, 2021

(30) Foreign Application Priority Data

Oct. 31, 2018  (JP) .................................. 2018-205294
Oct. 31, 2018  (JP) .................................. 2018-205295

(51) Int. Cl.
| | | |
|---|---|---|
| *C01B 32/182* | (2017.01) | |
| *C08K 3/04* | (2006.01) | |
| *C08L 39/06* | (2006.01) | |
| *H01M 4/133* | (2010.01) | |
| *H01M 10/0525* | (2010.01) | |

(52) U.S. Cl.
CPC ............ *C01B 32/182* (2017.08); *C08K 3/042* (2017.05); *C08L 39/06* (2013.01); *H01M 4/133* (2013.01); *H01M 10/0525* (2013.01); *C01P 2002/85* (2013.01); *C01P 2004/64* (2013.01); *C01P 2006/12* (2013.01); *C08K 2201/005* (2013.01); *C08K 2201/006* (2013.01); *C08K 2201/011* (2013.01)

(58) Field of Classification Search
CPC .............................. C01B 32/182; H01M 4/133
See application file for complete search history.

(56) References Cited

U.S. PATENT DOCUMENTS

| | | | | |
|---|---|---|---|---|
| 9,634,315 | B2* | 4/2017 | Hayner | H01M 4/62 |
| 9,745,441 | B2* | 8/2017 | Hasegawa | H01B 1/24 |
| 2012/0308891 | A1 | 12/2012 | Todoriki et al. | |
| 2015/0118554 | A1* | 4/2015 | Wu | H01G 11/32 |
| | | | | 361/528 |
| 2017/0066897 | A1 | 3/2017 | Hasegawa et al. | |
| 2018/0261402 | A1 | 9/2018 | Manabe et al. | |
| 2018/0261830 | A1 | 9/2018 | Yang et al. | |
| 2018/0269465 | A1 | 9/2018 | Hirai et al. | |

FOREIGN PATENT DOCUMENTS

| | | |
|---|---|---|
| CN | 107352533 A | 11/2017 |
| EP | 3358650 A1 | 8/2018 |
| EP | 3367479 A1 | 8/2018 |
| JP | 2013101983 A | 5/2013 |
| JP | 2015059079 A | 3/2015 |
| JP | 2017135105 A | 8/2017 |
| WO | 2017047521 A1 | 3/2017 |
| WO | 2017047522 A1 | 3/2017 |
| WO | 2017047523 A1 | 3/2017 |
| WO | 2017152853 A1 | 9/2017 |

OTHER PUBLICATIONS

International Search Report and Written Opinion for International Application No. PCT/JP2019/042102, dated Dec. 17, 2019, 5 pages.
Partial Supplementary European Search Report for European Application No. 19 880 785.1, dated Jul. 18, 2022, 12 pages.

* cited by examiner

*Primary Examiner* — Stuart L Hendrickson

(74) *Attorney, Agent, or Firm* — Buchanan Ingersoll & Rooney PC

(57) ABSTRACT

A graphene dispersion liquid containing graphene dispersed in a dispersion medium is described, in which, in the graphene contained in the dispersion liquid, a proportion of graphene with a size in the plane direction of 500 nm or more and 1 μm or less is 30% or more on an area basis, and a proportion of graphene with a size in the plane direction of 10 μm or more and 50 μm or less is 30% or more on an area basis. The graphene dispersion liquid is in a stable dispersion state and forms a strong conductive path.

15 Claims, 1 Drawing Sheet

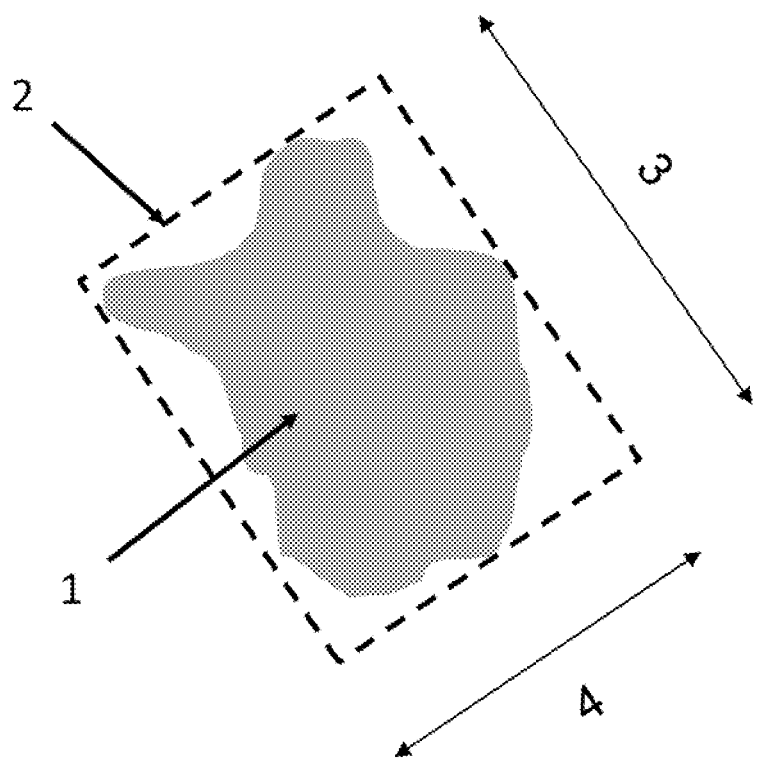

GRAPHENE DISPERSION LIQUID, METHOD FOR PRODUCING SAME, AND ELECTRODE FOR SECONDARY BATTERY

CROSS REFERENCE TO RELATED APPLICATIONS

This is the U.S. National Phase application of PCT/JP2019/042102, filed Oct. 28, 2019, which claims priority to Japanese Patent Application No. 2018-205294, filed Oct. 31, 2018 and Japanese Patent Application No. 2018-205295, filed Oct. 31, 2018, the disclosures of these applications being incorporated herein by reference in their entireties for all purposes.

FIELD OF THE INVENTION

The present invention relates to a graphene dispersion liquid used as a conductive additive for an electrode for a secondary battery or the like, a method for producing the same, and an electrode for a secondary battery.

BACKGROUND OF THE INVENTION

Graphene is a two-dimensional crystal consisting of carbon atoms and is a material on which great attention has been focused since its discovery in 2004. Graphene has excellent electric, thermal, optical, and mechanical characteristics, and is expected to be applied in wide areas such as graphene composite materials, nanoelectronics, flexible/transparent electronics, nanocomposite materials, supercapacitors, batteries, hydrogen storage, nanomedical, and bioengineering materials.

Examples of the graphene production method include a mechanical exfoliation method, a CVD (Chemical Vapor Deposition) method, a CEG (Crystal Epitaxial Growth) method, a redox method, and the like. Among them, the redox method, that is, a method of obtaining oxidized graphite or graphite oxide by oxidation treatment of natural graphite and then producing graphene by a reduction reaction, is promising as an industrial production method because it can be mass-produced.

Graphene is expected to have various applications, but in particular, it is highly expected to be applied as a conductive additive for a positive electrode of lithium-ion battery. As a positive electrode active material of lithium-ion battery currently in practical use, positive electrode active materials such as $LiNi_{0.8}Co_{0.15}Al_{0.05}O_2$ in which a part of Ni atoms of lithium nickelate ($LiNiO_2$) is substituted with a Co atom and an Al atom, and $LiMn_xNi_yCo_{1-x-y}O_2$ in which a part of Ni atoms is substituted with an Mn atom and a Co atom have been generally used as high-capacity positive electrode active materials. It has been known that these positive electrode active materials have higher electron conductivity than other positive electrode active materials. When these positive electrode active materials are used as an electrode for a lithium-ion battery, they must be used in combination with a conductive additive such as carbon, and it is required that resistance of the electrode can be reduced with a small amount of the conductive additive, and battery capacity when used repeatedly can be maintained. Since graphene has a thin layer shape and high conductivity, it is expected that graphene may be able to solve the above-mentioned problems when used as a conductive additive.

However, graphene having a high specific surface area tends to agglomerate due to van der Waals interaction, so that it is difficult to disperse it well in a dispersion medium. Therefore, for example, even when it was added to an electrode as a conductive additive or the like, it could not be appropriately dispersed in a matrix of the electrode, and excellent potential of graphene could not be drawn out.

Thus, research and development are being carried out in order to obtain a dispersion liquid in which graphene is well dispersed in a dispersion medium. Patent Documents 1 to 4 describe that a graphene/organic solvent dispersion is prepared by adding an organic solvent to graphene obtained by reducing graphene oxide in an aqueous dispersion liquid.

Further, Patent Document 5 has reported that, by using graphene with a size in the plane direction equal to or less than a particle size of a positive electrode active material, the graphene comes into surface contact with the active material, so that resistance of the electrode is reduced even with a small amount of conductive additive.

Patent Document 6 has reported that conductivity and bondability between active material particles are improved by mixing graphene (graphene net) with a large size in the plane direction with an active material with an average particle diameter of 150 nm or less.

PATENT DOCUMENTS

Patent Document 1: Japanese Patent Laid-Open Publication No. 2015-059079
Patent Document 2: International Publication No. 2017/047521
Patent Document 3: International Publication No. 2017/047522
Patent Document 4: International Publication No. 2017/047523
Patent Document 5: Japanese Patent Laid-open Publication No. 2017-135105
Patent Document 6: Japanese Patent Laid-open Publication No. 2013-101983

SUMMARY OF THE INVENTION

When a dispersion liquid as described in Patent Documents 1 to 4 is used, graphene can be well dispersed in a matrix even when used as a conductive additive for an electrode or the like, so that graphene can be distributed over the entire electrode. However, since the size in the plane direction of graphene is small, a large amount of graphene is required to form a conductive path, and contact resistance increases, so that efficient conductive paths cannot be formed over the entire electrode and thus sufficient charge/discharge performance could not be obtained in some cases.

When graphene with a size in the plane direction equivalent to the particle size of the active material is used as in Patent Document 5, an initial electrode has sufficient conductivity on the surface of the active material, but when used repeatedly, the active materials are separated from each other, and the resistance of the electrode tends to increase.

Further, when the graphene with a large size in the plane direction with respect to the particle size of the active material is used in order to enhance the bonding between the active material particles as in Patent Document 6, the number of the conductive paths reduces when compared with the same weight, so that it becomes difficult to extract electrons from the surface of the active material that is not in direct contact with the graphene, and the resistance of the electrode tends to increase.

An object of the present invention is to provide a graphene dispersion liquid that can be well dispersed in a matrix and can form efficient conductive paths over the entire electrode.

Also, an object of the present invention is further to obtain an electrode in which efficient conductive paths are formed over the entire electrode by preparing an electrode using such a graphene dispersion liquid as a conductive additive.

The present invention for solving the above problems is a graphene dispersion liquid containing graphene dispersed in a dispersion medium, in which, in the graphene contained in the dispersion liquid, a proportion of graphene with a size in the plane direction of 500 nm or more and 5 µm or less is 30% or more on an area basis, and a proportion of graphene with a size in the plane direction of 10 µm or more and 50 µm or less is 30% or more on an area basis.

Also, another aspect of the present invention is an electrode paste for a secondary battery containing the graphene dispersion liquid and a positive electrode active material.

In addition, another aspect of the present invention is a method for producing a graphene dispersion liquid according to any one of claims 1 to 7, including a step of mixing a first graphene material with an area mean value of size in the plane direction of 500 nm or more and 5 µm or less, and a second graphene material with an area mean value of size in the plane direction of 10 µm or more and 50 µm or less.

Moreover, another aspect of the present invention is graphene powder in which a proportion of graphene with a size in the plane direction of 500 nm or more and 5 µm or less is 30% or more on an area basis, and a proportion of graphene with a size in the plane direction of 10 µm or more and 50 µm or less is 30% or more on an area basis.

Further, another aspect of the present invention is an electrode for a secondary battery containing active material particles for a secondary battery and graphene, when a median diameter of the active material particles for a secondary battery is Da, a proportion of graphene with a size in the plane direction of 0.05 Da or more and 0.5 Da or less is 30% or more on an area basis, and a proportion of graphene with a size in the plane direction of 1.0 Da or more and 5.0 Da or less is 30% or more on an area basis.

Furthermore, another aspect of the present invention is a method for producing an electrode for a secondary battery, including the step of mixing active material particles for a secondary battery and a graphene material, including the step of preparing, when the median diameter of the active material particles for a secondary battery is Da, (A) active material particles for a secondary battery, (G1) a first graphene material with an area mean value of size in the plane direction of 0.05 Da or more and 0.5 Da or less, and (G2) a second graphene material with an area mean value of size in the plane direction of 1.0 Da or more and 5.0 Da or less, and simultaneously or stepwise mixing (A) the active material for a secondary battery, (G1) the first graphene material, and (G2) the second graphene material.

The graphene dispersion liquid of the present invention can disperse graphene well in an object to which the graphene is to be dispersed, and can form efficient conductive paths in the entire object. For example, when the graphene dispersion liquid of the present invention is used as a conductive additive for an electrode, an electrode in which efficient conductive paths are formed over the entire electrode can be obtained.

BRIEF DESCRIPTION OF THE DRAWINGS

The FIGURE shows an illustration of a method for measuring size in the plane direction of graphene.

DETAILED DESCRIPTION OF EMBODIMENTS OF THE INVENTION

<Graphene Dispersion Liquid>

Graphene, in a narrow sense, refers to a sheet of $sp^2$-bonded carbon atoms (single-layer graphene) with a thickness of one atom, but in the present specification, those having a flaky form in which single-layer graphenes are laminated are also called graphene. Similarly, graphene oxide is also a designation including those having a laminated flaky form. The thickness of graphene is not particularly limited, but is preferably 100 nm or less, more preferably 50 nm or less, and further preferably 20 nm or less.

In the present specification, such graphene and graphene oxide are collectively referred to as "graphene material". The graphene oxide refers to a graphene material having a peak based on an interlayer distance of a graphene layer at 9.0° to 13.0° when powder obtained by drying a solvent is measured by X-ray diffraction. In addition, when discussing graphene focusing on individual graphene not as an aggregate, it may be referred to as "graphene piece" or the like.

In the graphene dispersion liquid of the present invention, in the graphene contained in the dispersion liquid, a proportion of graphene with a size in the plane direction of 500 nm or more and 5 µm or less (hereinafter, sometimes referred to as "small-diameter graphene") is 30% or more on an area basis, and a proportion of graphene (hereinafter, sometimes referred to as "large-diameter graphene") with a size in the plane direction of 10 µm or more and 50 µm or less is 30% or more on an area basis. The proportion of small-diameter graphene is preferably 70% or less on an area basis. The proportion of large-diameter graphene is preferably 70% or less on an area basis.

The size in the plane direction is measured as follows. First, the graphene dispersion liquid is diluted to 0.002% by mass using N-methylpyrrolidone (NMP), and the diluted solution is dropped on a glass substrate, and dried. Thereafter, the obtained graphene powder is observed with a laser microscope to obtain an observation image. Individual graphene pieces are selected in the observation image, and biaxial average diameter is obtained based on the image. The biaxial average diameter can be obtained using a general image software. Specifically, it is possible to measure using image analysis type particle size distribution measurement software Mac-View Ver. 4.0 manufactured by Mountech Co., Ltd. or the like. To describe the measurement process concretely, as shown in the FIGURE, a circumscribed rectangle 2 of a graphene piece 1 is drawn from the observation image so that an area of the circumscribed rectangle is minimized. A long side (major axis 3) and a short side (minor axis 4) of the circumscribed rectangle 2 are measured, and an arithmetic mean value thereof ((major axis+minor axis)/2) is taken as a size in the plane direction of each graphene piece 1.

In this way, the size in the plane direction and area of 200 graphene pieces were randomly measured, and a percentage obtained by dividing a total area of graphenes with a size in the plane direction of 500 nm or more and 5 µm or less among all measured graphene pieces by an integrated value of the area of all measured graphene pieces is taken as an area-based proportion of small-diameter graphene. Further, a percentage obtained by dividing a total area of graphenes with a size in the plane direction of 10 µm or more and 50 µm or less by an integrated value of the area of all measured graphene pieces is taken as an area-based proportion of large-diameter graphene. When there are particles with a size in the plane direction of less than 50 nm and coarse particles with a size in the plane direction of more than 500 µm among the 200 randomly extracted particles, they are excluded from the calculation.

Small-diameter graphene has a large number of conductive paths per weight. In addition, when used for preparing an electrode or the like, the small-diameter graphene tends to coat particles contained in a mixture layer (for example, active material particles in a lithium-ion battery and activated carbon particles in a capacitor), and can enhance conductivity of particle surface. On the other hand, since large-diameter graphene has a relatively large size in the plane direction, it tends to be responsible for long-distance conductive path formation and contact and bonding between particles. By using a dispersion liquid containing both small-diameter graphene and large-diameter graphene at a proportion within the above ranges for electrode preparation, the small-diameter graphene tends to come into surface contact with the particles, and the large-diameter graphene tends to strengthen bonding between the particles. Therefore, conductivity is increased over the entire mixture layer of the electrode. In addition, small-diameter graphene which plays a role of surface contact with particles and large-diameter graphene which plays a role of strengthening bonding between the particles interact with each other such as n-n interaction and hydrogen bond. Therefore, as compared with the case of using single graphene, it is possible to form a stronger conductive path, and it is possible to maintain high conductivity for a long period of time.

Not only when it is used for preparing an electrode, but also in, for example, an antistatic coating, a transparent conductive film, or a graphene self-supporting film obtained by directly filtering a graphene dispersion liquid, a dense conductive path is formed by the small-diameter graphene, and the large-diameter graphene tends to strengthen bonding between particles, thus the same effect can be obtained by using the graphene dispersion liquid of the present invention.

In a more preferable aspect, in the graphene dispersion liquid of the present invention, a proportion of graphene with a size in the plane direction of 1 µm or more and 3 µm or less is 30% or more on an area basis, and a proportion of graphene with a size in the plane direction of 10 µm or more and 20 µm or less is 30% or more on an area basis. The proportion of graphene of 1 µm or more and 3 µm or less is preferably 40% or more, and more preferably 45% or more on an area basis. Also, the proportion of graphene of 1 µm or more and 3 µm or less is preferably 70% or less, more preferably 60% or less, and further preferably 55% or less on an area basis. The proportion of graphene of 10 µm or more and 20 µm or less is preferably 40% or more, and more preferably 45% or more on an area basis. The proportion of graphene of 10 µm or more and 20 µm or less is preferably 70% or less, more preferably 60% or less, and further preferably 55% or less on an area basis.

Moreover, the proportion of small-diameter graphene with a size in the plane direction of 500 nm or more and 5 µm or less is preferably 40% or more, and more preferably 45% or more on an area basis. Further, the proportion of graphene with a size in the plane direction of 500 nm or more and 5 µm or less is preferably 60% or less, and more preferably 55% or less. Furthermore, the proportion of large-diameter graphene with a size in the plane direction of 10 µm or more and 50 µm or less is also preferably 40% or more, and more preferably 45% or more on an area basis. The proportion of large-diameter graphene with a size in the plane direction of 10 µm or more and 50 µm or less is preferably 60% or less, and more preferably 55% or less.

The dispersion medium is not particularly limited, but a polar dispersion medium is preferable. Specifically, examples of preferable polar dispersion medium include water or an organic solvent such as ethanol, methanol, 1-propanol, 2-propanol, N-methylpyrrolidone, dimethylformamide, dimethylacetamide, dimethyl sulfoxide and γ-butyrolactone. Among them, N-methylpyrrolidone (NMP) is particularly preferable in that the environmental load is low and it is easy to dry. It is preferable to use a dispersion medium containing 50% by mass or more of NMP.

When a dispersion medium containing 50% by mass or more of NMP is used as a dispersion medium, an absorbance at a wavelength of 270 nm of a diluted solution diluted by adding NMP to the graphene dispersion liquid of the present invention so that a weight fraction of graphene is 0.000013 when that of the entire diluted solution is 1 is measured using a spectrophotometer, and a weight-based absorptivity coefficient calculated using the following formula (1) (hereinafter, simply referred to as "weight-based absorptivity coefficient") is preferably 25,000 cm$^{-1}$ or more and 200,000 cm$^{-1}$ or less. The weight-based absorptivity coefficient indicates an absorption component of graphene, and excludes an absorbance of the dispersion medium itself.

$$\text{Weight-based absorptivity coefficient (cm}^{-1}\text{)}=\text{Absorbance}/\{(0.000013\times\text{Optical path length of cell (cm)}\} \quad (1)$$

A large weight-based absorptivity coefficient means that surface area per weight of graphene contained in the dispersion liquid is large. If the weight-based absorptivity coefficient is less than 25,000 cm$^{-1}$, the graphene contained will be low in the degree of exfoliation or in dispersibility in NMP, so that it is difficult to form and maintain good conductive paths in a resin or electrode paste that is a matrix of the electrode. Also, if the weight-based absorptivity coefficient is larger than 200,000 cm$^{-1}$, the graphene will have an increased viscosity due to an increased surface area, resulting in deterioration in handleability of the graphene dispersion liquid. The weight-based absorptivity coefficient is preferably 40,000 cm$^{-1}$ or more and 150,000 cm$^{-1}$ or less, and more preferably 45,000 cm$^{-1}$ or more and 100,000 cm$^{-1}$ or less.

In order to obtain graphene with a weight-based absorptivity coefficient of 25,000 cm$^{-1}$ or more, graphene needs to be well dispersed in the dispersion liquid. For that purpose, it is effective to apply a high shear force using a mixer having a strong stirring force in the presence of graphene and the dispersion medium.

As the strong stirring mixer used in the strong stirring step, a device capable of achieving high peripheral speed, such as a planetary mixer with a disper, and ROBOMIX, is preferable. A mixer having a rotating blade such as a thin film rotation type or a rotor/stator type, in which distance from a wall surface is 10 mm or less, that is of a media-less system mixer having a high shear force is further preferable. Examples of such a mixer having a high shear force include FILMIX® model 30-30 (manufactured by PRIMIX Corporation), CLEARMIX® CLM-0.8S (manufactured by M Technique Co., Ltd.), SUPER SHEAR MIXER SDRT 0.35-0.75 (manufactured by Satake Chemical Equipment Mfg., Ltd.), and the like.

Further, the absorbance of the diluted solution prepared as described above at wavelengths of 270 nm and 600 nm was measured using a spectrophotometer, and a value of absorbance ratio calculated using the following formula (2) (hereinafter, simply referred to as "absorbance ratio") is preferably 1.70 or more and 4.00 or less, more preferably 1.80 or more and 3.00 or less, and further preferably 1.90 or more and 2.50 or less.

$$\text{Absorbance ratio} = \text{Absorbance (270 nm)} / \text{Absorbance (600 nm)} \quad (2)$$

Here, the absorbance (270 nm) and the absorbance (600 nm) mean the absorbance at wavelengths of 270 nm and 600 nm measured as described above, respectively.

The absorbance contains an absorption component of light and a scattering component, and the scattering component increases or decreases depending on the surface state of the graphene. The ratio of the scattered component occupied in the absorbance is small at a wavelength of 270 nm, but at a wavelength of 600 nm, the absorption component is small, so that the ratio of the scattered component occupied in the absorbance is large. When the absorbance ratio is small, it means that the graphene contained in the dispersion liquid is agglomerated. When the absorbance ratio is less than 1.70, it tends to be difficult to form and maintain good conductive paths in a resin or electrode paste. Further, when the absorbance ratio is larger than 4.00, the graphene is fragmented excessively, so that even if it is dispersed in the graphene dispersion liquid, it tends to agglomerate in a resin or electrode paste that is a matrix of the electrode.

In order to obtain a dispersion liquid having an absorbance ratio of 1.70 or more and 4.00 or less, it is effective to stir in the presence of a dispersion medium using the above-mentioned mixer having a strong stirring force to prevent graphene agglomeration.

Here, the absorbance of the diluted solution prepared as described above can be measured with an ultraviolet-visible spectrophotometer. The absorbance of graphene in the above formulas (1) and (2) can be obtained by subtracting the absorbance of a solvent of the diluted solution from the absorbance of the diluted solution prepared from the graphene dispersion liquid.

The graphene in the graphene dispersion liquid of the present invention preferably contains a surface treatment agent (hereinafter, may be simply referred to as "surface treatment agent"). The surface treatment agent is at least partly attached to the surface of graphene to exhibit an effect of enhancing dispersibility of the graphene.

The surface treatment agent may be a high molecular weight compound or a low molecular weight compound, but the low molecular weight compound is preferable from the viewpoint of enhancing conductivity of graphene.

As the surface treatment agent, a compound having an aromatic ring is preferable from the viewpoint of easily adsorbing on the graphene surface.

The surface treatment agent preferably has an acidic group or a basic group.

The acidic group is a group selected from a hydroxy group, a phenolic hydroxy group, a nitro group, a carboxyl group and a carbonyl group.

As the acidic group contained in the surface treatment agent, a phenolic hydroxy group is preferable. Examples of a compound having a phenolic hydroxy group include phenol, nitrophenol, cresol, catechol, and compounds having a structure in which a part thereof is substituted.

Among them, compounds having a catechol group are preferable as surface treatment agents because they have adhesiveness to graphene and dispersibility in a dispersion medium. Examples of the compounds having a catechol group include catechol, dopamine hydrochloride, 3-(3,4-dihydroxyphenyl)-L-alanine, 4-(1-hydroxy-2-aminoethyl) catechol, 3,4-dihydroxy benzoic acid, 3,4-dihydroxyphenyl acetic acid, caffeic acid, 4-methyl catechol, and 4-tert-butyl pyrocatechol.

As compounds having a basic group, compounds having an amino group are preferable because they have good dispersibility. In particular, compounds having an aromatic ring and an amino group are particularly preferable. Examples of such compounds include compounds such as benzylamine and phenylethylamine. It is also preferable as a surface treatment agent to have a catechol group in addition to the basic group. Examples of such a compound include dopamine hydrochloride.

Further, a surfactant having an acidic group or a basic group is also preferably used as a surface treatment agent. As the surfactant, any of a cationic surfactant, an anionic surfactant, a nonionic surfactant and the like can be used. However, since the anion and the cation themselves may be involved in an electrochemical reaction, a nonionic surfactant that is not ionized is suitable when used as a battery material.

Examples of the polymer compound include polyvinylpyrrolidone, polyvinyl alcohol, polymethyl vinyl ether, and the like.

The specific surface area of graphene contained in the graphene dispersion liquid of the present invention measured by a BET measurement method (hereinafter, may be simply referred to as "specific surface area") is preferably 80 $m^2/g$ or more and 250 $m^2/g$ or less. The specific surface area of the graphene reflects the thickness of graphene and the degree of exfoliation of graphene, and the larger the value, the thinner the graphene and the higher the degree of exfoliation. If the specific surface area of the graphene is less than 80 $m^2/g$, formation of a conductive network may be insufficient, and if it is more than 250 $m^2/g$, the dispersibility tends to decrease. The specific surface area of the graphene is more preferably 100 $m^2/g$ or more, and more preferably 130 $m^2/g$ or more. Also, the specific surface area of the graphene is preferably 200 $m^2/g$ or less, and more preferably 180 $m^2/g$ or less. The BET measurement method is performed by the method described in JIS 28830: 2013 for a sample after the graphene dispersion liquid is dried by a freeze dryer. The quantity of adsorbed gas is measured by carrier gas method, and the adsorption data are analyzed by one-point method.

The graphene existing in the graphene dispersion liquid of the present invention has an element ratio of oxygen to carbon (O/C ratio) measured by X-ray photoelectron spectroscopy (XPS) of preferably 0.05 or more and 0.40 or less. In measurement of the O/C ratio, the graphene dispersion liquid is pre-dried by a vacuum dryer or freeze dryer, then the dried sample is introduced into a measuring chamber having a high vacuum chamber, the surface of the sample placed in an ultra-high vacuum is irradiated with soft X-rays, and photoelectrons emitted from the surface are detected by an analyzer. The photoelectrons are measured by wide scan and narrow scan, and a value of binding energy of bound electrons in a substance is obtained to acquire elemental information on the substance surface.

When the graphene dispersion liquid of the present invention is measured by XPS, a C1s peak derived from carbon is detected near 284 eV, but it is known that the peak shifts to a high energy side when carbon is bonded to oxygen. Specifically, peaks based on a C—C bond, a C=C double bond and a C—H bond in which carbon is not bonded to oxygen do not shift and are detected near 284 eV, whereas peaks based on a C—O single bond, a C=O double bond and a COO bond shift to positions near 286.5 eV, 287.5 eV and 288.5 eV, respectively. Therefore, the C1s peak derived from carbon is detected in the form in which peaks near 284 eV, near 286.5 eV, near 287.5 eV and near 288.5 eV are overlapped. At the same time, an N1s peak derived from nitrogen is detected near 402 eV, and an O1s peak derived from oxygen is detected near 533 eV. The O/C ratio can be obtained from peak areas of the C1s peak and the O1s peak.

The oxygen atom on the graphene surface is an oxygen atom contained in an acidic group bonded to the graphene itself or an acidic group of a surface treatment agent attached to the graphene surface. Such an acidic group has an effect of improving the dispersion state of the graphene. If the number of acidic groups on the graphene surface is too small, dispersibility is deteriorated, whereas if it is too large, conductivity of the graphene is decreased and performance as a conductive additive is deteriorated. The O/C ratio of the graphene is preferably 0.07 or more, more preferably 0.09 or more, and further preferably 0.10 or more. Moreover, the O/C ratio of the graphene is preferably 0.30 or less, more preferably 0.20 or less, and further preferably 0.15 or less.

The O/C ratio of the graphene can be controlled by changing the degree of oxidation of graphene oxide as a raw material, or by changing the amount of the surface treatment agent. The higher the degree of oxidation of graphene oxide, the larger the amount of oxygen remaining after reduction, and the lower the degree of oxidation, the smaller the amount of oxygen atoms after reduction. Further, the amount of oxygen atoms can be increased by increasing the amount of the surface treatment agent having an acidic group attached.

Furthermore, the graphene existing in the dispersion liquid has an element ratio of nitrogen to carbon (N/C ratio) measured by XPS is preferably 0.005 or more and 0.020 or less, and more preferably 0.010 or more and 0.015 or less. The nitrogen atom on the graphene surface is derived from a nitrogen-containing functional group such as an amino group or a nitro group contained in the surface treatment agent, or a nitrogen-containing heterocycle such as a pyridine group or an imidazole group. It is preferable that such nitrogen-containing groups are appropriately contained in order to improve the dispersibility of graphene. If the N/C ratio of graphene exceeds 0.020, the nitrogen atoms replace the graphene conjugated structure, so that the conductivity is easily lowered. On the other hand, since the surface treatment agent containing a nitrogen element contributes to graphene dispersibility, it is preferable that the surface treatment agent exists to have an N/C ratio of 0.005 or more. The N/C ratio can be obtained from peak areas of the C1s peak and the N1s peak in the same manner as in the measurement of the O/C ratio.

In addition, in the present specification, even when a measured value by XPS of the dried sample of graphene prepared as described above contains a signal of atom derived from the surface treatment agent attached to the graphene surface, it is expressed as a measured value of the graphene.

The graphene dispersion liquid of the present invention preferably has a solid content of 0.3% by mass or more and 40% by mass or less. If the solid content exceeds 40% by mass, graphene is likely to stack in the dispersion liquid, and it is difficult to maintain a good dispersion state. If the solid content is less than 0.3% by mass, when the graphene dispersion liquid is used for production of electrode paste, the viscosity of the electrode paste is lowered, so that coating properties tend to be deteriorated. The solid content is more preferably 20% by mass or less, further preferably 10% by mass or less, still more preferably 7% by mass or less, and particularly preferably 5% by mass or less. If the solid content is 5% by mass or less, fluidity is good, and handleability is particularly excellent. Further, the solid content is more preferably 0.7% by mass or more, and further preferably 1% by mass or more.

Here, the solid content of the graphene dispersion liquid refers to a substance that remains after drying and removing the dispersion medium from the graphene dispersion liquid. The solid content of the graphene dispersion liquid can be calculated by measuring weight after drying and removing the dispersion medium from the graphene dispersion liquid, and dividing the measured value by weight of the graphene dispersion liquid itself. Specifically, about 1 g of the graphene dispersion liquid is weighed and then attached to a glass substrate of known weight, the glass substrate is heated on a hot plate temperature-controlled to 120° C. for 1.5 hours to volatilize the dispersion medium, and weight of the remaining graphene is measured.

<Electrode Paste for Secondary Battery and Electrode for Secondary Battery>

The electrode for a secondary battery of the present invention is an electrode for a secondary battery, in which, in the graphene contained in the electrode, a proportion of small-diameter graphene with a size in the plane direction of 500 nm or more and 5 μm or less is 30% or more on an area basis, and a proportion of large-diameter graphene with a size in the plane direction of 10 μm or more and 50 μm or less is 30% or more on an area basis. Such an electrode for a secondary battery is typically obtained by using the graphene dispersion liquid of the present invention described above as a conductive additive. The proportion of small-diameter graphene is preferably 70% or less on an area basis. The proportion of large-diameter graphene is preferably 70% or less on an area basis.

Further, one aspect of the electrode for a secondary battery of the present invention is an electrode for a secondary battery containing active material particles for a secondary battery and graphene, when a median diameter of the active material particles is Da, in the graphene contained in the electrode, a proportion of graphene with a size in the plane direction of 0.05 Da or more and 0.5 Da or less is 30% or more on an area basis, and a proportion of graphene with a size in the plane direction of 1.0 Da or more and 5.0 Da or less is 30% or more on an area basis. The proportion of graphene with a size in the plane direction of 0.05 Da or more and 0.5 Da or less is preferably 70% or less on an area basis. The proportion of graphene having a size in the plane direction of 1.0 Da or more and 5.0 Da or less is preferably 70% or less on an area basis. The relatively small former graphene tends to come into surface contact with the active material. The relatively large latter graphene also tends to enhance long-distance conductive path formation and bonding between the active materials. Therefore, an electrode having a strong conductive path can be obtained by containing both.

The electrode for a secondary battery is usually composed of a mixture layer composed of an active material for a secondary battery, a conductive additive and a binder, and a current collector foil.

The active material for a secondary battery is a material capable of electrochemically occluding and releasing lithium ions, and examples thereof include a positive electrode active material of a lithium-ion battery, a negative electrode active material of a lithium-ion battery, a sulfur active material, and a positive electrode (air electrode) active material of a metal air battery.

There is no specific limitation on the active material for a secondary battery. As the positive electrode active material, a metal oxide active material such as lithium manganate ($LiMn_2O_4$) having a spinel-type structure, lithium manganate ($LiMnO_2$) having a rock salt-type structure, lithium cobaltate ($LiCoO_2$), lithium nickelate ($LiNiO_2$), $LiNi_xMn_yCo_{1-x-y}O_2$ in which nickel is partially substituted with manganese and cobalt, ternary $LiNi_xCo_yAl_{1-x-y}O_2$ in which nickel is partially substituted with cobalt and aluminum, or $V_2O_3$; a metal compound active material such as $TiS_2$, $MoS_2$ or $NbSe_2$; lithium iron phosphate ($LiFePO_4$) having an olivine-type structure, or lithium manganese phosphate ($LiMnPO_4$); a solid solution active material or the like can be used.

Also, as the negative electrode active material, a material that forms an alloy with lithium, such as titanium (Ti), tin (Sn), lead (Pb), indium (In), silicon (Si), antimony (Sb), bismuth (Bi), gallium (Ga), germanium (Ge), arsenic (As), hafnium (Hf), zirconium (Zr) or yttrium (Y); a silicon compound containing Si, SiO, SiC, SiOC or the like as a basic constituent element; a lithium-doped conductive polymer such as polyacetylene or polypyrrole or the like can be used.

The median diameter of the active material particles contained in the electrode is preferably 5 μm or more and 20 μm or less. In the present specification, the median diameter of the active material particles is obtained by observing the active material particles with a scanning electron microscope (SEM), measuring diameters of 100 randomly selected active material particles, and taking a median thereof. Here, the diameter of the active material particle is an arithmetic mean value of a longest diameter and a shortest diameter of the observed individual active material particles. When directly measuring the median diameter of the active material particles contained in the electrode, the median diameter can be calculated by observing a surface of the electrode by SEM and measuring diameters of 100 active material particles appearing on the surface. The active material may be a granulated body. When the active material is a granulated body, the diameter represents a secondary particle size, not a primary particle diameter. Specifically, the median diameter of the active material shall be measured according to a measurement example described later.

As the conductive additive, it is preferable to use either the graphene dispersion liquid or the graphene powder of the present invention, but other conductive additives may be used in combination.

As the binder, a fluoropolymer such as polyvinylidene fluoride (PVDF) or polytetrafluoroethylene (PTFE), or a rubber such as styrene-butadiene rubber (SBR) or natural rubber can be used.

By mixing the active material, conductive additive and binder with an appropriate amount of a solvent, an electrode paste for a secondary battery can be formed. That is, the electrode paste contains an active material for a secondary battery, a conductive additive, a binder and a solvent. By applying the electrode paste to a current collector foil and drying it, a mixture layer containing an active material, a conductive additive and a binder can be formed on the current collector foil.

The graphene dispersion liquid of the present invention is useful as a conductive additive in the electrode paste for a secondary battery. That is, the electrode paste for a secondary battery containing the graphene dispersion liquid of the present invention and the positive electrode active material is also one aspect of the present invention.

The graphene can be separated from the electrode as follows. Since a part of the small-diameter graphene may attach firmly to the active material, it is necessary to collect it in two stages in order to completely recover it. Hereinafter, graphene firmly attached to the active material is referred to as graphene A, the others are referred to as graphene B, and a mixture of both is referred to as graphene AB.

First, a battery is disassembled in an Ar glove box, and the electrode is washed with dimethyl carbonate and vacuum-dried in a side box of the Ar glove box for 1 hour. Next, the mixture layer is peeled off from the current collector foil using a spatula, the obtained powder is dissolved in a solvent such as N-methylpyrrolidone (NMP) or water, and the resulting solution is filtered to separate the solution into a filter product (active material for a secondary battery, graphene AB, solvent) and a filtrate (solvent, binder). The obtained filter product is vacuum-dried, a solvent in an amount of 5-fold the weight of the filter product is added to the filter product, and the resulting solution is treated using a device capable of applying a strong shear force such as FILMIX® model 30-30 (PRIMIX Corporation) or a wet jet mill. Thereafter, the resulting solution is filtered to separate the solution into a filter product (active material for a secondary battery, graphene A) and a filtrate (graphene B, solvent). The filtrate was washed with a solvent and then dried to recover graphene B.

Further, with respect to the filter product (active material for a secondary battery, graphene A), the active material for a secondary battery is dissolved by using an acid such as hydrochloric acid or nitric acid, and then the resulting solution is filtered to separate the solution into a filter product (graphene A) and a filtrate (dissolved active material for a secondary battery, water). Further, the filter product was washed with water and then dried to recover graphene A. Physical properties of the graphene of the present invention contained in the electrode can be known by mixing the recovered graphene A and graphene B with a rotation-revolution mixer and then analyzing the mixture.

<Graphene Powder>

The graphene powder of the present invention is graphene powder in which a proportion of small-diameter graphene with a size in the plane direction of 500 nm or more and 5 μm or less is 30% or more on an area basis, and a proportion of large-diameter graphene with a size in the plane direction of 10 μm or more and 50 μm or less is 30% or more on an area basis are contained. The proportion of small-diameter graphene is preferably 70% or less on an area basis. The proportion of large-diameter graphene is preferably 70% or less on an area basis. In addition, the "graphene powder" in the present specification is a term used as aggregation of graphene pieces, and does not refer to individual graphene pieces.

Graphene powder can be obtained by removing a dispersion medium from a graphene dispersion liquid obtained by a method for producing a graphene dispersion liquid of the present invention, by using a freeze-drying method, a spray-drying method, or the like. Further, the graphene powder of the present invention can also be obtained by mixing each powdered small-diameter graphene and the large-diameter graphene in a powdered state.

As described above, it is preferable to use graphene in the state of a dispersion liquid in order to ensure high dispersibility during use, but even if graphene powder is used, the effect of forming conductive paths by containing both large-diameter graphene and small-diameter graphene can be obtained in the same manner depending on the application.

<Method for Producing Graphene Dispersion Liquid>

As the method for producing a graphene dispersion liquid of the present invention, as an example, a graphene dispersion liquid can be produced by a method for producing a graphene dispersion liquid including a step of mixing a first graphene material with an area mean value of size in the plane direction of 500 nm or more and 5 µm or less, and a second graphene material with an area mean value of size in the plane direction of 10 µm or more and 50 µm or less. Preferably, the first graphene material and the second graphene material are mixed so that a proportion of small-diameter graphene material with a size in the plane direction of 500 nm or more and 5 µm or less is 30% or more on an area basis, and a proportion of large-diameter graphene material with a size in the plane direction of 10 µm or more and 50 µm or less is 30% or more on an area basis, in the graphene after mixing. The proportion of small-diameter graphene is preferably 70% or less on an area basis. The proportion of large-diameter graphene is preferably 70% or less on an area basis.

The area mean value of size in the plane direction of each graphene material can be measured as follows. First, the graphene material is diluted to 0.002% by mass using N-methylpyrrolidone (NMP), and the diluted solution is dropped on a glass substrate and dried. Then, the graphene material on the glass substrate is observed with a laser microscope, and size in the plane direction of each graphene material piece is calculated by the method described above. Then, the size in the plane direction and area of 100 graphene material pieces are randomly measured, and the area mean value of size in the surface direction is obtained. When there are particles with a size in the plane direction of less than 50 nm and coarse particles with a size in the plane direction of more than 500 µm among the 100 randomly extracted graphene material pieces, they are excluded from the calculation.

Here, the area mean value is a value obtained by the following formula (3) when the size in the plane direction of each graphene piece is arranged in the order of measurement, the size in the plane direction of i-th graphene piece is Ai, and the area is Si.

$$\text{Area mean value} = \Sigma(Ai \times Si)/\Sigma Si \quad (3)$$

As the first graphene material, it is preferable to use a material with an area-based median of size in the plane direction of 500 nm or more and 5 µm or less. As the second graphene material, it is preferable to use a material with an area-based median of size in the plane direction of 10 µm or more and 50 µm or less. The area-based median of size in the plane direction of the graphene material can also be measured according to the above method.

If the first graphene material and the second graphene material are dried once to be powdered before being mixed, the graphene materials tend to agglomerate strongly with each other. Therefore, it is preferable that the first graphene material and the second graphene material are respectively mixed in the state of a dispersion liquid. The dispersion medium used at this time is not particularly limited, but it is preferable to use a dispersion medium in which the graphene material is partially or entirely dissolved. As such a dispersion medium, a polar dispersion medium is preferable, and preferred examples thereof include water, ethanol, methanol, 1-propanol, 2-propanol, N-methylpyrrolidone, dimethylformamide, dimethylacetamide, dimethyl sulfoxide, γ-butyrolactone, and the like.

The dispersion liquids of the first and second graphene materials are obtained by dispersing the graphene materials with a predetermined size in the plane direction in a dispersion medium. Further, it is preferable to provide a step of adjusting the size in the plane direction of the graphene material to an area average of 500 nm or more and 5 µm or less by performing a shearing treatment on the graphene material dispersion liquid to prepare a dispersion liquid of the first graphene material and/or a step of adjusting the size in the plane direction of the graphene material to an area average of 10 µm or more and 50 µm or less by performing a shearing treatment on the graphene material dispersion liquid to prepare a dispersion liquid of the second graphene material because it is easy to control the size in the plane direction of the graphene material. The larger the shear force in the shearing treatment and the longer the treatment time, the smaller the size in the plane direction of the graphene material tends to be. Therefore, it is possible to prepare a graphene material with a size in the plane direction adjusted to a predetermined range, by selecting treatment type and treatment conditions.

As a method of shearing treatment, a media-less dispersion method, which can give a strong shear force to the dispersion liquid without using a crushing medium, is preferably used because it can prevent agglomeration of the graphene material. Examples of the media-less dispersion method include a technique of causing a pressure-applied graphene material dispersion liquid to collide against a single ceramic ball, a technique using a liquid-liquid shear type wet jet mill which causes pressure-applied graphene material dispersion liquids to collide with each other for dispersion, a technique of applying ultrasonic waves to a graphene material dispersion liquid, and the like.

The shearing treatment is preferably performed in a solid content concentration in the graphene material dispersion liquid of 0.01% to 2%, and more preferably 0.05% to 1%. Further, when performing ultrasonic treatment, ultrasonic output is preferably 100 W or more and 3000 W or less, and more preferably 200 W or more and 2000 W or less. Ultrasonic treatment time is preferably 10 minutes or more and 10 hours or less, more preferably 20 minutes or more and 5 hours or less, and particularly preferably 30 minutes or more and 3 hours or less.

In the method for producing a graphene dispersion liquid of the present invention, the first graphene material and the second graphene material prepared as described above are mixed. A device for mixing is not particularly limited, but a planetary mixer (INOUE MFG., INC.), a homodisper (PRIMIX Corporation), FILMIX (PRIMIX Corporation) or the like can be used.

The first graphene material and the second graphene material to be mixed may be graphene or graphene oxide before reduction. When graphene oxide is used, the graphene dispersion liquid of the present invention can be obtained by performing reduction treatment after mixing.

A method of reduction treatment is not particularly limited, but chemical reduction is preferable. In the case of chemical reduction, examples of a reducing agent include an organic reducing agent and an inorganic reducing agent. Inorganic reducing agents are more preferable in terms of ease of washing after reduction.

Examples of the organic reducing agent include an aldehyde reducing agent, a hydrazine derivative reducing agent, and an alcohol reducing agent. Among them, an alcohol reducing agent is particularly suitable because it can reduce graphene oxide relatively mildly. Examples of the alcohol reducing agent include methanol, ethanol, propanol, isopropyl alcohol, butanol, benzyl alcohol, phenol, ethanolamine, ethylene glycol, propylene glycol, diethylene glycol, and the like.

Examples of the inorganic reducing agent include sodium dithionite, potassium dithionite, phosphorous acid, sodium borohydride, hydrazine and the like. Among them, sodium dithionite and potassium dithionite are suitably used because they can reduce graphene oxide while relatively retaining acidic groups, so graphene having high dispersibility in a dispersion medium can be produced.

<Method for Producing Electrode for Secondary Battery>

As a method for producing an electrode for a secondary battery of the present invention, as an example, an electrode for a secondary battery can be produced by a method including the step of mixing active material particles for a secondary battery and a graphene material, including preparing, when the median diameter of the active material particles for a secondary battery is Da, (A) active material particles for a secondary battery, (G1) a first graphene material with an area mean value of size in the plane direction of 0.05 Da or more and 0.5 Da or less, and (G2) a second graphene material with an area mean value of size in the plane direction of 1.0 Da or more and 5.0 Da or less, and simultaneously or stepwise mixing (A) the active material particles for a secondary battery, (G1) the first graphene material, and (G2) the second graphene material.

In this method, first, (A) active material particles for a secondary battery, and when the median diameter of the active material particles for a secondary battery is Da, (G1) a first graphene material with an area mean value of size in the plane direction of 0.05 Da or more and 0.5 Da or less, and (G2) a second graphene material with an area mean value of size in the plane direction of 1.0 Da or more and 5.0 Da or less are prepared.

As the active material particles for a secondary battery, the above-mentioned particles can be used. The method for measuring a median diameter is also as described above.

The first graphene material preferably has area-based average and median of the size in the plane direction of 0.05 Da or more and 0.5 Da or less. The second graphene material preferably has area-based average and median of the size in the plane direction of 1.0 Da or more and 5.0 Da or less.

The first graphene material and the second graphene material may be prepared in a powder state, but if the first graphene material and the second graphene material are dried once to be powdered before being mixed, the graphene materials tend to agglomerate strongly with each other. Therefore, it is preferable that the first graphene material and the second graphene material are respectively prepared in the state of a dispersion liquid.

The dispersion liquids of the first and second graphene materials are obtained by each dispersing the graphene materials with a predetermined size in the plane direction in a dispersion medium. The dispersion medium is not particularly limited, but it is preferable to use a dispersion medium in which the graphene material is partially or entirely dissolved. Preferable examples of such a dispersion medium include the polar dispersion medium described above.

When preparing the dispersion liquids of the first and second graphene materials, it is preferable to perform a step of adjusting the area mean value of size in the plane direction of the graphene material to 0.05 Da or more and 0.5 Da or less by performing a shearing treatment on the graphene material dispersion liquid to prepare a dispersion liquid of the first graphene material and/or a step of adjusting the area mean value of size in the plane direction of the graphene material to 1.0 Da or more and 5.0 Da or less by performing a shearing treatment on the graphene material dispersion liquid to prepare a dispersion liquid of the second graphene material because it is easy to control the size in the plane direction of the graphene material. The larger the shear force in the shearing treatment and the longer the treatment time, the smaller the size in the plane direction of the graphene material tends to be. Therefore, it is possible to prepare a graphene material with a size in the plane direction adjusted to a predetermined range, by selecting treatment type and treatment conditions. The method and conditions of the shearing treatment are as described above.

(A) The active material particles for a secondary battery, (G1) the first graphene material, and (G2) the second graphene material prepared as described above are mixed simultaneously or stepwise. Here, mixing stepwise means to mix the three in any order of (1) first mixing (A) and (G1), and further mixing with (G2), (2) first mixing (A) and (G2), and further mixing with (G1), and (3) first mixing (G1) and (G2), and further mixing with (A).

In the present invention, it is particularly preferable to use the order of (1), that is, to first mix the active material particles for a secondary battery and the first graphene material, and then mixing with the second graphene. If only the active material particles for a secondary battery and the first graphene are mixed in advance, more graphene tends to come into surface contact with the active material, and efficient conductive path formation becomes possible.

As a device used for such mixing, a device capable of applying a shear force is preferable, and examples thereof include a planetary mixer, FILMIX® (PRIMIX Corporation), a rotation-revolution mixer, a planetary ball mill, and the like.

It is preferable that the first graphene material and the second graphene material are respectively mixed in an amount of 0.05 parts by weight or more and 1.0 part by weight or less based on 100 parts by weight of the active material particles for a secondary battery. If it exceeds 1.0 part by weight, graphene tends to inhibit conduction of lithium ions. Further, if it is less than 0.05 parts by weight, formation of conductive paths becomes insufficient, and the electrode tends to have high resistance.

An electrode for a secondary battery can be formed by preparing an electrode paste for a secondary battery by mixing the active material particles for a secondary battery and the graphene material mixed as described above with the above-mentioned binder and an appropriate amount of solvent and applying the electrode paste to a current collector foil and drying and pressing it. Examples of the solvent include N-methylpyrrolidone, γ-butyrolactone, carboxymethyl cellulose, dimethylacetamide and the like, and N-methylpyrrolidone is particularly preferable.

EXAMPLES

Measurement Example 1: X-Ray Photoelectron Measurement

X-ray photoelectron measurement was performed using Quantera SXM (manufactured by PHI). Excited X-ray is monochromatic Al Kα1,2 rays (1486.6 eV), X-ray diameter is 200 μm, and photoelectron take-off angle is 45°. A C1s main peak originating from carbon atoms was assigned to a peak near 284.3 eV, an O1s peak originating from oxygen atoms was assigned to a peak near 533 eV, an N1s peak originating from nitrogen atoms was assigned to a peak near 402 eV, and O/C ratio and N/C ratio were determined from area ratios between the peaks. The measurement was performed on graphene powders prepared in the following Examples and Comparative Examples, or graphene powder obtained by filtering the graphene aqueous dispersion liquid before dispersion in NMP with a suction filter, then repeating a washing step of diluting to 0.5% by mass with water and subjecting the diluted liquid to suction filtration 5 times, and further freeze-drying the resulting product.

Measurement Example 2: Evaluation of Specific Surface Area

Specific surface area of graphene was measured using HM Model-1210 (manufactured by Macsorb). Measurements were made according to JIS 28830: 2013, the quantity of adsorbed gas was measured by carrier gas method, and the adsorption data were analyzed by one-point method. Degassing conditions were 100° C.×180 minutes. The measurement was performed on the graphene powder prepared in each of the following Examples and Comparative Examples, or the graphene powder obtained by filtering the graphene aqueous dispersion liquid before dispersion in NMP with a suction filter, then repeating a washing step of diluting to 0.5% by mass with water and subjecting the diluted liquid to suction filtration 5 times, and further freeze-drying the resulting product.

Measurement Example 3: Solid Content

The graphene NMP dispersion liquid obtained in each of Examples and Comparative Examples was attached to a glass substrate having a known weight, the weight was measured, and then the glass substrate was heated on a hot plate temperature-controlled to 120° C. for 1.5 hours to volatilize the dispersion medium. The solid content of the graphene NMP dispersion liquid was measured from the amount of the graphene dispersion liquid attached before heating and the amount of volatilization of the dispersion medium calculated from the weight difference before and after heating. This was repeated 3 times, and the average thereof was taken as an official solid content.

Measurement Example 4: Absorbance

Absorbance was measured using a U-3010 spectrophotometer (Hitachi High-Tech Science Corporation). A quartz cell with an optical path length of 10 mm was used. Measurement was performed using a diluted solution obtained by adding NMP to the graphene NMP dispersion liquid or graphene powder prepared in each of Examples and Comparative Examples so that a weight fraction of graphene was 0.000013 and treating the resulting solution using an ultrasonic cleaner (ASU-6M, manufactured by As One Corporation) with an output of 130 W and an oscillation frequency of 40 kHz at an output setting of High for 10 minutes. The diluted solution was measured after performing baseline measurement with a mixed solvent with the same content ratio as the diluted solution in advance. From the obtained absorbance at 270 nm, the weight-based absorptivity coefficient defined by the following formula was calculated.

Weight-based absorptivity coefficient $(cm^{-1})$=Absorbance/{(0.000013×Optical path length of cell (cm)}

In addition, an absorbance ratio defined by the following formula was calculated.

Absorbance ratio=Absorbance (270 nm)/Absorbance (600 nm)

Here, the absorbance (270 nm) and the absorbance (600 nm) mean the absorbance at wavelengths of 270 nm and 600 nm measured as described above, respectively.

Measurement Example 5: Thickness of Graphene

The graphene NMP dispersion liquid or graphene powder obtained in each of Examples, Comparative Examples and Synthesis Examples was diluted to 0.002% by mass using NMP, and the diluted solution was dropped on a mica substrate, dried to be attached to the substrate. Graphene on the substrate was observed with an atomic force microscope (Dimension Icon; Bruker), the thicknesses of 100 graphene were randomly measured, and the average particle size distribution was calculated. When there was a distribution in thickness in one piece, the area average was obtained.

Measurement Example 6: Size in Plane Direction of Graphene

Water was removed from the graphene powder obtained in each of Examples and Comparative Examples or the graphene aqueous dispersion liquids before dispersion in NMP by a freeze-drying method to obtain a graphene powder.

The graphene powder was diluted to 0.002% by mass using N-methylpyrrolidone (NMP), and the diluted solution was dropped on a glass substrate and dried. Graphene on the substrate was observed with a laser microscope VK-X250 manufactured by Keyence Corporation using a 50× objective lens, individual graphene pieces were selected from the observed images, and the biaxial average diameter was measured. The biaxial average diameter was obtained by image analysis type particle size distribution measurement software Mac-View Ver. 4.0 manufactured by Mountech Co., Ltd. The size and area of 200 graphene pieces were randomly measured in the plane direction, and a percentage obtained by dividing an integrated value of the area of graphene pieces with a size in the plane direction of 500 nm or more and 5 μm or less among all measured graphene pieces by an integrated value of the area of all measured graphenes was taken as an area-based proportion of small-diameter graphene, and a percentage obtained by dividing an integrated value of the area of graphene pieces with a size in the plane direction of 10 μm or more and 50 μm or less by an integrated value of the area of all measured graphenes was taken as an area-based proportion of large-diameter graphene to obtain an area-based particle size distribution.

When there were particles with a size in the plane direction of less than 50 nm and coarse particles with a size in the plane direction of more than 500 μm among the 200 randomly extracted particles, they were excluded from the calculation.

Moreover, the size in the plane direction of graphene in the electrode was measured as follows. A mixture layer was peeled off from a current collector foil of the electrode prepared in each of Examples and Comparative Examples, the obtained powder was dissolved in NMP, and the resulting solution was filtered to separate the solution into a filter product 1 (active material for a secondary battery, graphene, solvent) and filtrate 1 (solvent, binder). The obtained filter product 1 was vacuum-dried, a solvent in an amount of 5-fold the weight of the filter product was added to the filter product, and the resulting solution was treated using FIL-MIX® model 30-30 (PRIMIX Corporation) and then filtered to separate the solution into filter product 2 (active material for a secondary battery, graphene) and filtrate 2 (graphene, solvent). The filtrate 2 was washed with water and then dried to recover graphene.

Further, the filter product 2 (active material for a secondary battery, graphene) was treated with an acid such as hydrochloric acid or nitric acid, thereby dissolving the active material for a secondary battery contained in the filter product 2, and then the resulting solution was filtered to separate the solution into filter product 3 (graphene) and filtrate 3 (active material for a secondary battery, water). Further, the filter product 3 was washed with water and then dried to recover graphene. The graphene recovered first and the graphene recovered later were mixed with a rotation-revolution mixer, then diluted to 0.002% by mass using NMP, and the diluted solution was dropped on a glass substrate, and dried. Thereafter, the graphene material on the glass substrate was observed with a laser microscope VK-X250, and the size in the plane direction was randomly measured for 100 graphenes. A percentage obtained by dividing a total area of graphenes with a size in the plane direction of 0.05 Da or more and 0.5 Da or less among all graphenes by an integrated value of the area of all measured graphenes was taken as an area-based proportion of small-diameter graphene, and a percentage obtained by dividing a total area of graphenes with a size in the plane direction of 1.0 Da or more and 5 Da or less by an integrated value of the area of all measured graphenes was taken as an area base of large-diameter graphene.

Measurement Example 7: Evaluation of Battery Performance

An amount of the graphene dispersion liquid or graphene powder prepared in each of Examples and Comparative Examples was 0.5 parts by weight, 100 parts by weight of $LiNi_{0.5}Co_{0.2}Mn_{0.3}O_2$ (manufactured by Umicore S.A., median diameter 10 μm) as an electrode active material, 1.0 part by weight of polyvinylidene fluoride (manufactured by ARKEMA S.A., HSV-900) as a binder and 30 parts by weight of NMP as a dispersion medium were mixed using a planetary mixer to obtain an electrode paste. When the NMP dispersion liquid of graphene was used, the NMP to be added was adjusted so that the total amount of NMP was 30 parts by weight. This electrode paste was applied to an aluminum foil (thickness 18 μm) as a current collector foil using a doctor blade so that the basis weight after drying was 15.0 mg/cm² to form a mixture layer on the current collector foil. After drying in a hot air oven at 80° C. for 30 minutes, the resulting laminate was pressed by a roll press so that the thickness of the mixture layer was 40 μm, and vacuum-dried at 120° C. for 5 hours to obtain an electrode plate. The prepared electrode plate was cut out to a diameter of 16.1 mm and used as a positive electrode.

Next, 98 parts by weight of graphite (manufactured by Ito Graphite Co., Ltd., model number SG-BH8, particle diameter 8 μm), 1 part by weight of sodium carboxymethyl cellulose (manufactured by Daicel FineChem Ltd., model number #2200), 1 part by weight of an SBR aqueous dispersion liquid (manufactured by JSR Corporation, model number TRD2001) and ion-exchanged water were added so that the solid content concentration of the electrode paste to be obtained was 50%, and the mixture was mixed at 30 RPM for 30 minutes using a planetary mixer to obtain an electrode paste. This electrode paste was applied to a copper foil (thickness 10 μm) as a current collector foil so as to be 7.7 mg/cm² using a doctor blade to form a mixture layer on the current collector foil. Thereafter, the resulting laminate was pressed by a roll press (manufactured by THANK METAL CO., LTD.) so that the thickness of the mixture layer was 40 μm, and vacuum-dried at 80° C. for 5 hours using a glass tube oven to obtain an electrode plate. The prepared electrode plate was cut out to a diameter of 16.8 mm and used as a negative electrode.

Celgard #2400 (manufactured by Celgard, LLC) cut out to a diameter of 16.8 mm as a separator, and LBG-00425 (manufactured by Kishida Chemical Co., Ltd., 1 mol/L $LiPF_6$ EC:DMC (3:7 v/v %)+VC (3 wt %)) as an electrolytic solution were used. A 2032 type coin cell was prepared by sandwiching the separator and the electrolytic solution between the positive electrode and the negative electrode described above. The obtained coin cell was set in a charge-discharge test system (TOSCAT-3100 manufactured by Toyo System Co., Ltd.) and subjected to an electrochemical evaluation. Charge/discharge measurements were performed three times each at an upper limit voltage of 4.2 V and a lower limit voltage of 2.5 V, and a rate of 0.1 C, 1 C and 5 C in this order, and then 291 more times at 1 C, for a total of 300 charge/discharge measurements. Discharge capacities of the third at a rate of 1 C, the third at a rate of 5 C, and the subsequent 291st (300th in total) at a rate of 1 C were measured.

The rate of 5 C is a condition with a relatively large current for a lithium-ion battery. If a conductive path in an electrode is not formed, capacity becomes low when a large current is applied. The capacity when measured under the condition at a rate of 5 C being high indicates that efficient conductive paths can be formed over the entire electrode. Further, by repeating charging and discharging, a deteriorated state of the battery can be estimated. The higher the battery capacity after repeating charging and discharging 300 times, the longer the conductive path can be maintained.

Measurement Example 8: Measurement of Median Diameter of Active Material

The active material particles for a secondary battery used in each of Examples and Comparative Examples were observed at 3,000 times to 400,000 times in multiple fields of view by a scanning electron microscope (Hitachi Ltd., S-5500), diameter of 100 particles were randomly measured, and the median diameter (D50) was calculated.

Example 1-1

[Preparation of Graphene Oxide/Aqueous Dispersion Liquid]

In an ice bath, 220 ml of 98% concentrated sulfuric acid, 5 g of sodium nitrate and 30 g of potassium permanganate were added to 10 g of 1500 mesh natural graphite powder (Shanghai yifan's graphite CO., LTD), and the mixture was mechanically stirred for 1 hour. Temperature of the mixed solution was kept below 20° C. The mixed solution was removed from the ice bath and stirred and reacted in a water bath at 35° C. for another 4 hours. Thereafter, 500 ml of ion-exchanged water was added thereto, and the mixture was reacted at 90° C. for another 15 minutes. Finally, 600 ml of ion-exchanged water and 50 ml of hydrogen peroxide were added thereto, and the mixture was reacted for 5 minutes to obtain a graphene oxide dispersion liquid. This was filtered while hot and the filter product was washed with a dilute hydrochloric acid solution to remove metal ions. Further, the filter product was washed with ion-exchanged water to remove the acid, and washing was repeated until the pH reached 7 to obtain a graphene oxide gel. The element ratio of oxygen atoms to carbon atoms of the obtained graphene oxide gel measured by X-ray photoelectron spectroscopy was 0.53.

The graphene oxide gel thus prepared was diluted with ion-exchanged water to a concentration of 30 mg/ml and then treated with an ultrasonic cleaner for 30 minutes to obtain a uniform graphene oxide aqueous dispersion liquid.

[Surface Treatment]

20 ml of the graphene oxide aqueous dispersion liquid prepared as described above was mixed with 0.3 g of dopamine hydrochloride as a surface treatment agent, and the mixture was treated with Homodisper Model 2.5 (PRI-MIX Corporation) at a rotating speed of 3,000 rpm for 60 minutes to perform surface treatment of graphene oxide.

[Preparation and Mixing of First/Second Graphene Oxide Dispersion Liquids]

The surface-treated graphene oxide aqueous dispersion liquid was divided into two parts of 10 ml each. Only one 10 ml of the graphene oxide aqueous dispersion liquid was subjected to ultrasonic treatment with an output of 300 W for 30 minutes using an ultrasonic apparatus UP400S (manufactured by hielscher) to obtain a first graphene oxide aqueous dispersion liquid. The area mean value of size in the plane direction of the graphene oxide contained in the first graphene oxide aqueous dispersion liquid was 3.6 µm. Further, 10 ml of the dispersion liquid which was not subjected to ultrasonic treatment was taken as a second graphene oxide aqueous dispersion liquid. The area mean value of size in the plane direction of the graphene oxide contained in the second graphene oxide aqueous dispersion liquid was 20 µm.

Thereafter, 10 ml of each of the above first and second graphene oxide aqueous dispersion liquids was mixed.

[Reduction of Graphene Oxide]

The mixed graphene oxide aqueous dispersion liquid was diluted to 5 mg/ml with ion-exchanged water, 0.3 g of sodium dithionite was added to 20 ml of the diluted graphene oxide aqueous dispersion liquid, and a reduction reaction was carried out for 1 hour while the mixture was kept at 40° C. to obtain a graphene aqueous dispersion liquid.

[Preparation of Graphene NMP Dispersion Liquid]

The obtained graphene aqueous dispersion liquid was dried by a freeze-drying method to obtain a graphene powder. Thereafter, NMP was added to the graphene powder so as to have a solid content of 0.5%, and the mixture was treated using FILMIX® model 30-30 (PRIMIX Corporation) at a peripheral speed of 40 m/s for 60 seconds and then filtered with a suction filter to obtain a graphene NMP dispersion liquid.

Example 1-2

A graphene oxide aqueous dispersion liquid was obtained in the same manner as in Example 1 up to the step of [Surface treatment].

[Reduction of Graphene Oxide]

Twenty milliliters of the graphene oxide aqueous dispersion liquid was diluted to 5 mg/ml with ion-exchanged water, 0.3 g of sodium dithionite was added to 20 ml of the diluted graphene oxide aqueous dispersion liquid, and a reduction reaction was carried out for 1 hour while the mixture was kept at 40° C. to obtain a graphene aqueous dispersion liquid.

[Preparation and Mixing of First/Second Graphene Dispersion Liquids]

After dividing the obtained graphene aqueous dispersion liquid into two so as to have the same weight, only one of the graphene aqueous dispersion liquid was subjected to ultrasonic treatment with an output of 300 W for 30 minutes using an ultrasonic apparatus UP400S (manufactured by hielscher) to obtain a first graphene aqueous dispersion liquid. The area mean value of size in the plane direction of graphene contained in the first graphene aqueous dispersion liquid was 3.7 µm. Further, the dispersion liquid which was not subjected to ultrasonic treatment was used as a second graphene aqueous dispersion liquid. The area mean value of size in the plane direction of graphene contained in the second graphene aqueous dispersion liquid was 19 µm. Thereafter, the first and second graphene aqueous dispersion liquids were mixed to obtain a graphene aqueous dispersion.

[Preparation of Graphene NMP Dispersion Liquid]

From the obtained graphene aqueous dispersion liquid, a graphene NMP dispersion liquid was obtained in the same manner as in Example 1.

Example 1-3

A graphene oxide aqueous dispersion liquid was obtained in the same manner as in Example 1 up to the step of [Surface treatment].

[Preparation and Mixing of First/Second Graphene Oxide Powders]

First and second graphene oxide aqueous dispersion liquids were obtained in the same manner as in Example 1, and then each freeze-dried to obtain first and second graphene oxide powders. Thereafter, the first and second graphene oxide powders were mixed with a rotation-revolution mixer.

[Reduction of Graphene Oxide]

The obtained mixed powder was diluted with ion-exchanged water to 5 mg/ml, and then reduced in the same manner as in Example 1 to obtain a graphene aqueous dispersion liquid. The obtained graphene aqueous dispersion liquid was dried by a freeze-drying method to obtain a graphene powder.

Example 1-4

A graphene aqueous dispersion liquid was obtained in the same manner as in Example 2 up to the step of [Reduction of graphene oxide].

[Preparation and Mixing of First/Second Graphene Dispersion Liquids]

The obtained graphene aqueous dispersion liquid was freeze-dried to obtain a graphene powder. The obtained graphene powder was divided into two so as to have the same weight. After diluting one of the graphene powders divided into two with ion-exchanged water to 5 mg/ml to prepare a graphene aqueous dispersion liquid, 10 ml of the dispersion liquid was subjected to ultrasonic treatment with an output of 300 W for 30 minutes using an ultrasonic apparatus UP400S (manufactured by hielscher). The obtained graphene aqueous dispersion liquid was dried by a freeze-drying method to obtain a first graphene powder. In addition, the remaining graphene powder divided into two was taken as a second graphene powder. The first and second graphene powders were mixed with a rotation-revolution mixer to obtain a graphene powder.

Example 1-5

A graphene NMP dispersion liquid was obtained in the same manner as in Example 1 except that the first graphene oxide dispersion liquid was prepared with an output of ultrasonic treatment of 1000 W in the step of [Preparation and mixing of first/second graphene oxide dispersion liquids] in Example 1.

Example 1-6

A graphene NMP dispersion liquid was obtained in the same manner as in Example 1 except that the first graphene oxide dispersion liquid was prepared with an output of ultrasonic treatment of 1000 W for 30 minutes and 10 ml of other graphene oxide dispersion liquid was also subjected to ultrasonic treatment with an output of 50 W for 5 minutes to prepare a second graphene oxide dispersion in the step of [Preparation and mixing of first/second graphene oxide dispersion liquids] in Example 1.

Example 1-7

A graphene NMP dispersion liquid was obtained in the same manner as in Example 1 except that the first graphene oxide dispersion liquid was prepared with an output of ultrasonic treatment of 1500 W for 30 minutes and 10 ml of other graphene oxide dispersion liquid was also subjected to ultrasonic treatment with an output of 100 W for 5 minutes to prepare a second graphene oxide dispersion in the step of [Preparation and mixing of first/second graphene oxide dispersion liquids] in Example 1.

Comparative Example 1-1

A graphene oxide aqueous dispersion liquid was obtained in the same manner as in Example 1 up to the step of [Surface treatment].

Instead of the step of "Preparation and mixing of first/second graphene oxide dispersion liquids" in Example 1, all 20 ml of the graphene oxide aqueous dispersion liquid without dividing was subjected to ultrasonic treatment with an output of 300 W for 30 minutes using an ultrasonic apparatus UP400S (manufactured by hielscher).

Thereafter, the steps of [Reduction of graphene oxide] and [Preparation of graphene NMP dispersion liquid] were carried out in the same manner as in Example 1 to obtain a graphene NMP dispersion liquid.

Comparative Example 1-2

A graphene NMP dispersion liquid was obtained in the same manner as in Example 1 except that the step of [Preparation and mixing of first/second graphene oxide dispersion liquids] was omitted and the step of [Reduction of graphene oxide] was directly carried out on the surface-treated graphene oxide aqueous dispersion.

Comparative Example 1-3

A graphene NMP dispersion liquid was obtained in the same manner as in Example 1 except that the first graphene oxide dispersion liquid was prepared with an output of ultrasonic treatment of 1500 W for 1 hour and 10 ml of other graphene oxide dispersion liquid was also subjected to ultrasonic treatment with an output of 1500 W for 30 minutes to prepare a second graphene oxide dispersion in the step of [Preparation and mixing of first/second graphene oxide dispersion liquids] in Example 1.

Tables 1 and 2 show outline of the preparation method of the graphene NMP dispersion liquid or graphene powder in Examples 1-1 to 1-7 and Comparative Examples 1-1 to 1-3, physical properties of graphene in the obtained graphene dispersion liquid, and results of the evaluation of battery performance (Measurement Example 7) of a lithium-ion battery equipped with an electrode prepared using each graphene dispersion liquid.

TABLE 1

| | Preparation method of graphene NMP dispersion liquid or graphene powder | | | Physical properties of graphene | | | | | | |
|---|---|---|---|---|---|---|---|---|---|---|
| | Ultrasonic treatment conditions | Area average of size in plane direction | Form when mixing (1) (2) | O/C Ratio | N/C Ratio | Specific surface area [$m^2/g$] | Solid content [% by mass] | Weight-based absorptivity coefficient [$cm^{-1}$] | Absorbance ratio 270 nm/ 600 nm | Thickness [nm] |
| Example 1-1 | (1) 300 W for 30 minutes (2) No treatment | (1) 3.6 μm (2) 20 μm | Graphene oxide dispersion liquid | 0.15 | 0.014 | 154 | 4.1 | 50100 | 1.75 | 17 |
| Example 1-2 | (1) 300 W for 30 minutes (2) No treatment | (1) 3.7 μm (2) 19 μm | Graphene dispersion liquid | 0.13 | 0.013 | 155 | 4.2 | 52300 | 1.76 | 17 |
| Example 1-3 | (1) 300 W for 30 minutes (2) No treatment | (1) 3.6 μm (2) 20 μm | Graphene oxide powder | 0.12 | 0.012 | 70 | — | 20200 | 0.7 | 30 |
| Example 1-4 | (1) 300 W for 30 minutes (2) No treatment | (1) 5.5 μm (2) 30 μm | Graphene powder | 0.12 | 0.014 | 40 | — | 10500 | 0.5 | 60 |
| Example 1-5 | (1) 1,000 W for 30 minutes (2) No treatment | (1) 1.8 μm (2) 20 μm | Graphene oxide dispersion liquid | 0.15 | 0.014 | 163 | 4.1 | 52100 | 1.78 | 14 |
| Example 1-6 | (1) 1,000 W for 30 minutes (2) 50 W for 5 minutes | (1) 1.8 μm (2) 10.5 μm | Graphene oxide dispersion liquid | 0.15 | 0.014 | 153 | 4.1 | 50080 | 1.74 | 15 |

TABLE 1-continued

| | Preparation method of graphene NMP dispersion liquid or graphene powder | | | Physical properties of graphene | | | | | | |
|---|---|---|---|---|---|---|---|---|---|---|
| | Ultrasonic treatment conditions | Area average of size in plane direction | Form when mixing (1) (2) | O/C Ratio | N/C Ratio | Specific surface area [m²/g] | Solid content [% by mass] | Weight-based absorptivity coefficient [cm⁻¹] | Absorbance ratio 270 nm/ 600 nm | Thickness [nm] |
| Example 1-7 | (1) 1,500 W for 30 minutes (2) 100 W for 5 minutes | (1) 1.3 μm (2) 11 μm | Graphene oxide dispersion liquid | 0.15 | 0.014 | 155 | 4.1 | 50060 | 1.72 | 14 |
| Comparative Example 1-1 | 300 W for 30 minutes | 3.6 μm | — | 0.14 | 0.012 | 151 | 4 | 55000 | 1.65 | 18 |
| Comparative Example 1-2 | No treatment | 20 μm | — | 0.12 | 0.014 | 164 | 3.9 | 53100 | 1.72 | 17 |
| Comparative Example 1-3 | (1) 1,500 W for 1 hour (2) 1,500 W for 30 minutes | (1) 0.75 μm (2) 1.3 μm | — | 0.14 | 0.012 | 151 | 4 | 55000 | 1.72 | 14 |

(1): First graphene material
(2): Second graphene material

TABLE 2

| | Proportion of graphene with size in plane direction is in following range [%] | | | | Battery characteristics | | |
|---|---|---|---|---|---|---|---|
| | 500 nm or more and 5 μm or less | 1 μm or more and 3 μm or less | 10 μm or more and 50 μm or less | 10 μm or more and 20 μm or less | Discharge capacity at 1 C [mAh/g] | Discharge capacity at 5 C [mAh/g] | Discharge capacity at 1 C (300 cycles) [mAh/g] |
| Example 1-1 | 40 | 21 | 43 | 33 | 153 | 117 | 135 |
| Example 1-2 | 40 | 20 | 40 | 31 | 151 | 116 | 134 |
| Example 1-3 | 40 | 18 | 34 | 26 | 149 | 108 | 113 |
| Example 1-4 | 34 | 10 | 32 | 24 | 150 | 107 | 110 |
| Example 1-5 | 46 | 41 | 43 | 35 | 153 | 117 | 142 |
| Example 1-6 | 48 | 43 | 48 | 42 | 154 | 121 | 145 |
| Example 1-7 | 49 | 47 | 49 | 46 | 154 | 124 | 148 |
| Comparative Example 1-1 | 85 | 43 | 5 | 1 | 153 | 103 | 93 |
| Comparative Example 1-2 | 4 | 1 | 95 | 68 | 152 | 95 | 101 |
| Comparative Example 1-3 | 93 | 83 | 3 | 1 | 143 | 92 | 97 |

Synthesis Example 1: Preparation Method 1 of Graphene Dispersion Liquid

In an ice bath, 220 ml of 98% concentrated sulfuric acid, 5 g of sodium nitrate and 30 g of potassium permanganate were added to 10 g of 500 mesh natural graphite powder (Shanghai yifan's graphite CO., LTD), and the mixture was mechanically stirred for 1 hour. Temperature of the mixed solution was kept below 20° C. The mixed solution was removed from the ice bath and stirred and reacted in a water bath at 35° C. for another 4 hours. Thereafter, 500 ml of ion-exchanged water was added thereto, and the mixture was reacted at 90° C. for another 15 minutes. Finally, 600 ml of ion-exchanged water and 50 ml of hydrogen peroxide were added thereto, and the mixture was reacted for 5 minutes to obtain a graphene oxide dispersion liquid. This was filtered while hot and the filter product was washed with a dilute hydrochloric acid solution to remove metal ions. Further, the filter product was washed with ion-exchanged water to remove the acid, and washing was repeated until the pH reached 7 to obtain a graphene oxide gel. The element ratio O/C of oxygen atoms to carbon atoms of the obtained graphene oxide gel measured by X-ray photoelectron spectroscopy was 0.53. The graphene oxide gel was diluted with ion-exchanged water to a concentration of 30 mg/ml and then treated with an ultrasonic cleaner for 30 minutes to obtain a uniform graphene oxide dispersion liquid.

20 ml of the graphene oxide dispersion liquid prepared as described above was mixed with 0.3 g of dopamine hydrochloride as a surface treatment agent, and the mixture was treated with Homodisper Model 2.5 (PRIMIX Corporation) at a rotating speed of 3,000 rpm for 60 minutes to perform surface treatment of graphene oxide. The surface-treated graphene oxide dispersion liquid was divided into two parts of 10 ml each. Ultrasonic waves were applied to one 10 ml of the graphene oxide dispersion liquid with an output of 300 W for 30 minutes using an ultrasonic apparatus UP400S (manufactured by hielscher). The graphene oxide dispersion liquid after ultrasonic treatment was diluted to 5 mg/ml with ion-exchanged water, 0.3 g of sodium dithionite was added to 20 ml of the diluted dispersion liquid, and a reduction reaction was carried out for 1 hour while the mixture was kept at 40° C. The obtained graphene dispersion liquid was dried by a freeze-drying method to obtain a graphene powder. The area mean value of size in the plane direction of the graphene powder was 5.5 μm.

Thereafter, NMP was added to the graphene powder so as to have a solid content of 0.5%, and the mixture was treated with FILMIX® model 30-30 (PRIMIX Corporation) at a peripheral speed of 40 m/s for 60 seconds to obtain a graphene NMP dispersion liquid. The area mean value of size in the plane direction of graphene contained in the NMP dispersion liquid was 3.6 μm.

Synthesis Example 2: Preparation Method 2 of Graphene Dispersion Liquid

A graphene NMP dispersion liquid was obtained in the same manner as in Synthesis Example 1 except that ultrasonic treatment with an ultrasonic apparatus was not performed. The area mean value of size in the plane direction of graphene contained in the NMP dispersion liquid was 20 μm.

Synthesis Example 3: Preparation Method 3 of Graphene Dispersion Liquid

A graphene NMP dispersion liquid was obtained in the same manner as in Synthesis Example 1 except that ultrasonic waves were applied with an output of 1500 W for 30 minutes with an ultrasonic apparatus. The area mean value of size in the plane direction of graphene contained in the NMP dispersion liquid was 1.3 μm.

Synthesis Example 4: Preparation Method 4 of Graphene Dispersion Liquid

A graphene NMP dispersion liquid was obtained in the same manner as in Synthesis Example 1 except that ultrasonic waves were applied with an output of 100 W for 10 minutes with an ultrasonic apparatus. The area mean value of size in the plane direction of graphene contained in the NMP dispersion liquid was 4.6 μm.

Synthesis Example 5: Preparation Method 5 of Graphene Dispersion Liquid

A graphene NMP dispersion liquid was obtained in the same manner as in Synthesis Example 1, except that 100 mesh natural graphite powder (Shanghai yifan's graphite CO., LTD) was used as a raw material. The area mean value of size in the plane direction of graphene contained in the NMP dispersion liquid was 42 μm.

Synthesis Example 6: Preparation Method 6 of Graphene Dispersion Liquid

A graphene NMP dispersion liquid was obtained in the same manner as in Synthesis Example 1 except that ultrasonic waves were applied with an output of 1500 W for 1 hour with an ultrasonic apparatus. The area mean value of size in the plane direction of graphene contained in the NMP dispersion liquid was 0.75 μm.

Example 2-1

The graphene dispersion liquid prepared in Synthesis Example 1 (first graphene material) added so as to have 0.25 parts by weight of graphene, and the graphene dispersion liquid prepared in Synthesis Example 2 (second graphene material) added so as to have 0.25 parts by weight of graphene were mixed with a planetary mixer, then 100 parts by weight of $LiNi_{0.5}Co_{0.2}Mn_{0.3}O_2$ (manufactured by Umicore S.A., median diameter 10 μm) as an electrode active material and 1.0 part by weight of a polyvinylidene fluoride solution as solid content were added thereto and further mixed with a planetary mixer. Further, NMP was blended as a dispersion medium so that the total amount of NMP was 30 parts by weight, and the mixture was mixed with a planetary mixer to obtain an electrode paste. This electrode paste was applied to an aluminum foil (thickness 18 μm) using a doctor blade so that the basis weight after drying was 15.0 $mg/cm^2$, and dried at 80° C. for 30 minutes to form a mixture layer on the aluminum foil. Thereafter, the resulting laminate was pressed by a roll press so that the thickness of the mixture layer was 40 μm, and vacuum-dried to obtain an electrode.

Example 2-2

An electrode was obtained in the same manner as in Example 2-1 except that the graphene dispersion liquid prepared in Synthesis Example 3 (first graphene material), instead of the graphene dispersion liquid prepared in Synthesis Example 1, was added so as to have 0.25 parts by weight of graphene, and the graphene dispersion liquid prepared in Synthesis Example 2 (second graphene material) was added so as to have 0.25 parts by weight of graphene.

Example 2-3

The graphene dispersion liquid prepared in Synthesis Example 1 (first graphene material) added so as to have 0.5 parts by weight of graphene, and the graphene dispersion liquid prepared in Synthesis Example 2 (second graphene material) added so as to have 0.5 parts by weight of graphene were mixed with a planetary mixer, then 100 parts by weight of $LiNi_{0.5}Co_{0.2}Mn_{0.3}O_2$ (median diameter 10 μm) as an electrode active material and a polyvinylidene fluoride solution so as to have 1.0 part by weight of polyvinylidene fluoride were added thereto and further mixed with a planetary mixer. Further, NMP was blended as a dispersion medium so that the total amount of NMP was 30 parts by weight, and the mixture was mixed with a planetary mixer to obtain an electrode paste. This electrode paste was applied to an aluminum foil (thickness 18 μm) using a doctor blade, dried at 80° C. for 30 minutes, then pressed by a roll press, and vacuum-dried to obtain an electrode.

Example 2-4

The graphene dispersion liquid prepared in Synthesis Example 1 (first graphene material) added so as to have 1.5 parts by weight of graphene, and the graphene dispersion liquid prepared in Synthesis Example 2 (second graphene material) added so as to have 1.5 parts by weight of graphene were mixed with a planetary mixer, then 100 parts by weight of $LiNi_{0.5}Co_{0.2}Mn_{0.3}O_2$ (median diameter 10 μm) as an electrode active material and 3.0 parts by weight of a polyvinylidene fluoride solution as solid content were added thereto and further mixed with a planetary mixer. Further, NMP was blended as a dispersion medium so that the total amount of NMP was 30 parts by weight, and the mixture was mixed with a planetary mixer to obtain an electrode paste. This electrode paste was applied to an aluminum foil (thickness 18 μm) using a doctor blade, and dried at 80° C. for 30 minutes to form a mixture layer on the aluminum foil.

Thereafter, the resulting laminate was pressed by a roll press, and vacuum-dried to obtain an electrode.

Example 2-5

After mixing the graphene powder (the area mean value of size in the plane direction was 5.5 μm) (first graphene material) obtained by freeze-drying before being finally dispersed in NMP in Synthesis Example 1 so as to have 0.25 parts by weight of graphene, and the graphene powder (the area mean value of size in the plane direction was 30 μm) (second graphene material) obtained by freeze-drying before being finally dispersed in NMP in Synthesis Example 2 so as to have 0.25 parts by weight of graphene with a planetary mixer, 100 parts by weight of $LiNi_{0.5}Co_{0.2}Mn_{0.3}O_2$ (median diameter 10 μm) as an electrode active material and a polyvinylidene fluoride solution so as to have 1.0 part by weight of polyvinylidene fluoride were added thereto and mixed with a planetary mixer. Further, NMP was blended as a dispersion medium so that the total amount of NMP was 30 parts by weight, and the mixture was mixed with a planetary mixer to obtain an electrode paste. This electrode paste was applied to an aluminum foil (thickness 18 μm) using a doctor blade, and dried at 80° C. for 30 minutes to form a mixture layer on the aluminum foil. Thereafter, the resulting laminate was pressed by a roll press, and vacuum-dried to obtain an electrode.

Example 2-6

An electrode was obtained in the same manner as in Example 2-1 except that the graphene dispersion liquid prepared in Synthesis Example 4 (first graphene material) was added so as to have 0.25 parts by weight of graphene, and the graphene dispersion liquid prepared in Synthesis Example 2 (second graphene material) was added so as to have 0.25 parts by weight of graphene.

Example 2-7

An electrode was obtained in the same manner as in Example 2-1 except that the graphene dispersion liquid prepared in Synthesis Example 1 (first graphene material) was added so as to have 0.25 parts by weight of graphene, and the graphene dispersion liquid prepared in Synthesis Example 5 (second graphene material) was added so as to have 0.25 parts by weight of graphene.

Example 2-8

After mixing the graphene dispersion liquid prepared in Synthesis Example 1 (first graphene material) so as to have 0.25 parts by weight of graphene, and 100 parts by weight of $LiNi_{0.5}Co_{0.2}Mn_{0.3}O_2$ (median diameter 10 μm) as an electrode active material with a planetary mixer, and the graphene dispersion liquid prepared in Synthesis Example 2 (second graphene material) so as to have 0.25 parts by weight of graphene, and a polyvinylidene fluoride solution so as to have 1.0 part by weight of polyvinylidene fluoride were added thereto and further mixed with a planetary mixer. Further, NMP was blended as a dispersion medium so that the total amount of NMP was 30 parts by weight, and the mixture was mixed with a planetary mixer to obtain an electrode paste. This electrode paste was applied to an aluminum foil (thickness 18 μm) using a doctor blade, and dried at 80° C. for 30 minutes to form a mixture layer on the aluminum foil. Thereafter, the resulting laminate was pressed by a roll press, and vacuum-dried to obtain an electrode.

Example 2-9

An electrode was obtained in the same manner as in Example 2-2 except that $LiNi_{0.5}Co_{0.2}Mn_{0.3}O_2$ (median diameter 5 μm) was used as an electrode active material in Example 2-2.

Example 2-10

An electrode was obtained in the same manner as in Example 2-1 except that the graphene dispersion liquid prepared in Synthesis Example 4 (first graphene material) was added so as to have 0.25 parts by weight of graphene, the graphene dispersion liquid prepared in Synthesis Example 5 (second graphene material) was added so as to have 0.25 parts by weight of graphene and $LiNi_{0.5}Co_{0.2}Mn_{0.3}O_2$ (median diameter 20 μm) was used as an electrode active material.

Example 2-11

After mixing the graphene dispersion liquid prepared in Synthesis Example 2 (second graphene material) to be 0.25 parts by weight of graphene, and 100 parts by weight of $LiNi_{0.5}Co_{0.2}Mn_{0.3}O_2$ (median diameter 10 μm) as an electrode active material with a planetary mixer, and the graphene dispersion liquid prepared in Synthesis Example 1 (first graphene material) to be 0.25 parts by weight of graphene, and a polyvinylidene fluoride solution so as to have 1.0 part by weight of polyvinylidene fluoride were added thereto and further mixed with a planetary mixer. Further, NMP was blended as a dispersion medium so that the total amount of NMP was 30 parts by weight, and the mixture was mixed with a planetary mixer to obtain an electrode paste. This electrode paste was applied to an aluminum foil (thickness 18 μm) using a doctor blade, and dried at 80° C. for 30 minutes to form a mixture layer on the aluminum foil. Thereafter, the resulting laminate was pressed by a roll press, and vacuum-dried to obtain an electrode.

Comparative Example 2-1

The graphene dispersion liquid prepared in Synthesis Example 1 added so as to have 0.5 parts by weight of graphene, 100 parts by weight of $LiNi_{0.5}Co_{0.2}Mn_{0.3}O_2$ (median diameter 10 μm) as an electrode active material and a polyvinylidene fluoride solution added so as to have 1.0 part by weight of polyvinylidene fluoride were mixed with a planetary mixer, then NMP was blended as a dispersion medium so that the total amount of NMP was 30 parts by weight, and further mixing with a planetary mixer to obtain an electrode paste. This electrode paste was applied to an aluminum foil (thickness 18 μm) using a doctor blade, and dried at 80° C. for 30 minutes to form a mixture layer on the aluminum foil. Thereafter, the resulting laminate was pressed by a roll press, and vacuum-dried to obtain an electrode.

Comparative Example 2-2

An electrode was obtained in the same manner as in Comparative Example 2-1 except that the graphene dispersion liquid prepared in Synthesis Example 2 was used so as to have 0.5 parts by weight of graphene.

Comparative Example 2-3

An electrode was obtained in the same manner as in Comparative Example 2-1 except that the graphene dispersion liquid prepared in Synthesis Example 3 was used so as to have 0.5 parts by weight of graphene.

Comparative Example 2-4

An electrode was obtained in the same manner as in Example 2-1 except that the graphene dispersion liquid prepared in Synthesis Example 1 was added so as to have 0.25 parts by weight of graphene, and the graphene dispersion liquid prepared in Synthesis Example 3 was added so as to have 0.25 parts by weight of graphene.

Comparative Example 2-5

An electrode was obtained in the same manner as in Example 2-1 except that the graphene dispersion liquid prepared in Synthesis Example 3 was added so as to have 0.25 parts by weight of graphene, the graphene dispersion liquid prepared in Synthesis Example 6 was added so as to have 0.25 parts by weight of graphene and $LiNi_{0.5}Co_{0.2}Mn_{0.3}O_2$ (median diameter 20 μm) was used as an electrode active material, in Example 2-1.

Tables 3 and 4 show characteristics of graphene, and results of the evaluation of battery performance of a lithium-ion battery in Examples 2-1 to 11 and Comparative Examples 2-1 to 2-5. Regarding the comparative examples, for convenience of explanation, even if the graphene deviates from the size in the plane direction in the above-mentioned definitions of the first and second graphenes, when only one type of graphene was used, it is described in a "First graphene" column, and when two types of graphenes were used, a smaller graphene is described in the "First graphene" column and a larger graphene is described in a "Second graphene" column. Also, meanings of the numbers (1) to (3) described in an "Order of mixing" column are as follows.

As (A) active material particles for a secondary battery, (G1) first graphene material, and (G2) second graphene material, (1) first mixing (A) and (G1), and further mixing with (G2), (2) first mixing (A) and (G2), and further mixing with (G1), and (3) first mixing (G1) and (G2), and further mixing with (A).

TABLE 3

| | | First graphene material (graphene) | | | | | Second graphene material (graphene) |
|---|---|---|---|---|---|---|---|
| | Median diameter Da [μm] of active material particles | Size in plane direction [μm] | O/C Ratio | Specific surface area [m²/g] | Thickness [nm] | Content per 100 parts by weight of active material | Size in plane direction [μm] |
| Example 2-1 | 10 | 3.6 (0.36 Da) | 0.15 | 154 | 17 | 0.25 | 20 (2.0 Da) |
| Example 2-2 | 10 | 1.3 (0.13 Da) | 0.13 | 155 | 17 | 0.25 | 20 (2.0 Da) |
| Example 2-3 | 10 | 3.6 (0.36 Da) | 0.14 | 156 | 17 | 0.5 | 20 (2.0 Da) |
| Example 2-4 | 10 | 3.6 (0.36 Da) | 0.15 | 154 | 17 | 1.5 | 20 (2.0 Da) |
| Example 2-5 | 10 | 5.5 (0.55 Da) | 0.14 | 40 | 60 | 0.25 | 30 (3.0 Da) |
| Example 2-6 | 10 | 4.6 (0.46 Da) | 0.12 | 153 | 20 | 0.25 | 20 (2.0 Da) |
| Example 2-7 | 10 | 3.6 (0.36 Da) | 0.15 | 148 | 18 | 0.25 | 42 (4.2 Da) |
| Example 2-8 | 10 | 3.6 (0.36 Da) | 0.14 | 154 | 17 | 0.25 | 20 (2.0 Da) |
| Example 2-9 | 5 | 1.3 (0.26 Da) | 0.15 | 154 | 17 | 0.25 | 20 (4.0 Da) |
| Example 2-10 | 20 | 4.6 (0.23 Da) | 0.15 | 154 | 17 | 0.25 | 42 (2.1 Da) |
| Example 2-11 | 10 | 3.6 (0.36 Da) | 0.14 | 154 | 17 | 0.25 | 20 (2.0 Da) |
| Comparative Example 2-1 | 10 | 3.6 (0.36 Da) | 0.14 | 151 | 18 | 0.5 | |
| Comparative Example 2-2 | 10 | 20 (2.0 Da) | 0.12 | 164 | 17 | 0.5 | |
| Comparative Example 2-3 | 10 | 1.3 (0.13 Da) | 0.12 | 164 | 17 | 0.5 | |
| Comparative Example 2-4 | 10 | 1.3 (0.13 Da) | 0.12 | 154 | 16 | 0.25 | 3.6 (0.36 Da) |
| Comparative Example 2-5 | 20 | 0.75 (0.0375 Da) | 0.15 | 154 | 17 | 0.25 | 1.3 (0.065 Da) |

TABLE 3-continued

| | | Electrode materials (active material particles, graphene) Second graphene material (graphene) | | | | |
|---|---|---|---|---|---|---|
| | | | | | Mixing method | |
| | O/C Ratio | Specific surface area [m²/g] | Thickness [nm] | Content per 100 parts by weight of active material | Graphene condition when mixed | Order of mixing |
| Example 2-1 | 0.12 | 160 | 16 | 0.25 | Dispersion liquid | (3) |
| Example 2-2 | 0.12 | 158 | 18 | 0.25 | Dispersion liquid | (3) |
| Example 2-3 | 0.13 | 161 | 16 | 0.5 | Dispersion liquid | (3) |
| Example 2-4 | 0.12 | 160 | 15 | 1.5 | Dispersion liquid | (3) |
| Example 2-5 | 0.13 | 50 | 55 | 0.25 | Powder | (3) |
| Example 2-6 | 0.18 | 160 | 18 | 0.25 | Dispersion liquid | (3) |
| Example 2-7 | 0.17 | 159 | 17 | 0.25 | Dispersion liquid | (3) |
| Example 2-8 | 0.13 | 160 | 15 | 0.25 | Dispersion liquid | (1) |
| Example 2-9 | 0.14 | 158 | 18 | 0.25 | Dispersion liquid | (3) |
| Example 2-10 | 0.16 | 159 | 18 | 0.25 | Dispersion liquid | (3) |
| Example 2-11 | 0.13 | 160 | 15 | 0.25 | Dispersion liquid | (2) |
| Comparative Example 2-1 | | | | | Dispersion liquid | |
| Comparative Example 2-2 | | | | | Dispersion liquid | |
| Comparative Example 2-3 | | | | | Dispersion liquid | |
| Comparative Example 2-4 | 0.12 | 164 | 17 | 0.25 | Dispersion liquid | (3) |
| Comparative Example 2-5 | 0.14 | 155 | 18 | 0.25 | Dispersion liquid | (3) |

TABLE 4

| | Evaluation of electrode Proportion of graphene with size in plane direction is in following range [%] | | | | | | |
|---|---|---|---|---|---|---|---|
| | Small-diameter graphene | | Large-diameter graphene | | | | |
| | 0.05 Da or more and 0.5 Da or less | 0.1 Da or more and 0.3 Da or less | 1.0 Da or more and 5.0 Da or less | 1.0 Da or more and 2.0 Da or less | Small-diameter graphene 500 nm or more and 5 μm or less | 1 μm or more and 3 μm or less | Large-diameter graphene 10 μm or more and 50 μm or less |
| Example 2-1 | 40 | 22 | 43 | 34 | 40 | 22 | 43 |
| Example 2-2 | 48 | 41 | 42 | 35 | 48 | 41 | 42 |
| Example 2-3 | 40 | 21 | 40 | 35 | 40 | 21 | 40 |
| Example 2-4 | 40 | 20 | 43 | 35 | 40 | 20 | 43 |
| Example 2-5 | 33 | 13 | 32 | 24 | 33 | 13 | 32 |
| Example 2-6 | 37 | 14 | 43 | 33 | 37 | 14 | 43 |
| Example 2-7 | 42 | 21 | 31 | 15 | 42 | 21 | 31 |
| Example 2-8 | 40 | 22 | 43 | 35 | 40 | 22 | 43 |
| Example 2-9 | 48 | 40 | 42 | 32 | 49 | 39 | 44 |
| Example 2-10 | 46 | 40 | 41 | 31 | 38 | 16 | 32 |
| Example 2-11 | 40 | 22 | 39 | 34 | 40 | 22 | 39 |
| Comparative Example 2-1 | 78 | 45 | 5 | 2 | 78 | 45 | 5 |
| Comparative Example 2-2 | 4 | 1 | 84 | 80 | 4 | 1 | 84 |
| Comparative Example 2-3 | 80 | 70 | 7 | 2 | 80 | 70 | 7 |

TABLE 4-continued

| | | | | | | | |
|---|---|---|---|---|---|---|---|
| Comparative Example 2-4 | 80 | 60 | 3 | 1 | 80 | 60 | 3 |
| Comparative Example 2-5 | 96 | 19 | 1 | 1 | 97 | 23 | 2 |

| | Evaluation of electrode | | | |
|---|---|---|---|---|
| | Proportion of graphene with size in plane direction is in following range [%] | Battery characteristics | | |
| | Large-diameter graphene 10 μm or more and 20 μm or less | Discharge capacity at 1 C [mAh/g] | Discharge capacity at 5 C [mAh/g] | Discharge capacity at 1 C (300 cycles) [mAh/g] |
| Example 2-1 | 34 | 153 | 120 | 137 |
| Example 2-2 | 35 | 153 | 118 | 147 |
| Example 2-3 | 35 | 155 | 130 | 133 |
| Example 2-4 | 35 | 151 | 132 | 135 |
| Example 2-5 | 24 | 150 | 109 | 108 |
| Example 2-6 | 33 | 148 | 107 | 114 |
| Example 2-7 | 15 | 150 | 110 | 116 |
| Example 2-8 | 35 | 153 | 128 | 141 |
| Example 2-9 | 36 | 155 | 130 | 144 |
| Example 2-10 | 17 | 151 | 118 | 145 |
| Example 2-11 | 34 | 153 | 118 | 134 |
| Comparative Example 2-1 | 2 | 153 | 105 | 95 |
| Comparative Example 2-2 | 80 | 152 | 97 | 103 |
| Comparative Example 2-3 | 2 | 153 | 110 | 90 |
| Comparative Example 2-4 | 1 | 150 | 115 | 92 |
| Comparative Example 2-5 | 1 | 143 | 90 | 89 |

DESCRIPTION OF REFERENCE SIGNS

1: Graphene piece
2: Circumscribed rectangle
3: Major axis
4: Minor axis

The invention claimed is:

1. A graphene dispersion liquid comprising graphene dispersed in a dispersion medium, wherein, in the graphene contained in the dispersion liquid, a proportion of graphene with a size in the plane direction of 500 nm or more and 5 μm or less is 30% or more on an area basis, and a proportion of graphene with a size in the plane direction of 10 μm or more and 50 μm or less is 30% or more on an area basis.

2. The graphene dispersion liquid according to claim 1, wherein the graphene has a specific surface area measured by a BET measurement method of 80 m$^2$/g or more and 250 m$^2$/g or less.

3. The graphene dispersion liquid according to claim 1, wherein the graphene has an element ratio of oxygen to carbon (O/C ratio) measured by X-ray photoelectron spectroscopy of 0.05 or more and 0.40 or less.

4. The graphene dispersion liquid according to claim 1, wherein the graphene has an element ratio of nitrogen to carbon (N/C ratio) measured by X-ray photoelectron spectroscopy of 0.005 or more and 0.020 or less.

5. The graphene dispersion liquid according to claim 1, wherein the dispersion medium is a dispersion medium containing 50% by mass or more of N-methylpyrrolidone.

6. The graphene dispersion liquid according to claim 5, wherein an absorbance at a wavelength of 270 nm of a diluted solution diluted by adding N-methylpyrrolidone to the graphene dispersion liquid so that a weight fraction of graphene is 0.000013 when that of the entire diluted solution is 1 is measured using a spectrophotometer, and a weight-based absorptivity coefficient calculated using the following formula (1) is 25,000 cm$^{-1}$ or more and 200,000 cm$^{-1}$ or less:

$$\text{Weight-based absorptivity coefficient (cm}^{-1}\text{)}=\text{Absorbance}/\{(0.000013\times\text{Optical path length of cell (cm)}\} \quad (1).$$

7. The graphene dispersion liquid according to claim 5, wherein absorbance at wavelengths of 270 nm and 600 nm of a diluted solution diluted by adding N-methylpyrrolidone to the graphene dispersion liquid so that a weight fraction of graphene is 0.000013 when that of the entire diluted solution is 1 is measured using a spectrophotometer, and an absorbance ratio calculated using the following formula (2) is 1.70 or more and 4.00 or less:

$$\text{Absorbance ratio}=\text{Absorbance (270 nm)/Absorbance (600 nm)} \quad (2).$$

8. An electrode paste for a secondary battery comprising the graphene dispersion liquid according to claim 1 and a positive electrode active material.

9. A method for producing a graphene dispersion liquid according to claim 1, comprising a step of mixing a first graphene material with an area mean value of size in the plane direction of 500 nm or more and 5 μm or less, and a second graphene material with an area mean value of size in the plane direction of 10 μm or more and 50 μm or less.

10. The method for producing a graphene dispersion liquid according to claim 9, wherein graphene oxide is used as the first graphene material and the second graphene material.

11. Graphene powder wherein a proportion of graphene with a size in the plane direction of 500 nm or more and 5 μm or less is 30% or more on an area basis, and a proportion of graphene with a size in the plane direction of 10 µm or more and 50 µm or less is 30% or more on an area basis.

12. An electrode for a secondary battery comprising active material particles for a secondary battery and graphene, wherein
- a proportion of graphene with a size in the plane direction of 0.05 times the median diameter of the active material particles or more and 0.5 times the median diameter of the active material particles or less is 30% or more on an area basis, and
- a proportion of graphene with a size in the plane direction of 1.0 times the median diameter of the active material particles or more and 5.0 times the median diameter of the active material particles or less is 30% or more on an area basis.

13. The electrode for a secondary battery according to claim 12, wherein the graphene has an element ratio of oxygen to carbon (O/C ratio) measured by X-ray photoelectron spectroscopy of 0.05 or more and 0.40 or less.

14. The electrode for a secondary battery according to claim 12, wherein the active material particles for a secondary battery have a median diameter of 5 µm or more and 20 µm or less.

15. A method for producing an electrode for a secondary battery according to claim 12, comprising the step of mixing active material particles for a secondary battery and a graphene material, comprising the step of preparing, (A) active material particles for a secondary battery, (G1) a first graphene material with an area mean value of size in the plane direction of 0.05 times the median diameter of the active material particles or more and 0.5 times the median diameter of the active material particles or less, and (G2) a second graphene material with an area mean value of size in the plane direction of 1.0 times the median diameter of the active material particles or more and 5.0 times the median diameter of the active material particles or less, and simultaneously or stepwise mixing (A) the active material particles for a secondary battery, (G1) the first graphene material, and (G2) the second graphene material.

* * * * *